US007405739B2

(12) United States Patent
Gannon

(10) Patent No.: US 7,405,739 B2
(45) Date of Patent: Jul. 29, 2008

(54) SYSTEM AND METHOD FOR CHANGING THE RELATIVE SIZE OF A DISPLAYED IMAGE

(75) Inventor: Aaron James Gannon, Anthem, AZ (US)

(73) Assignee: Honeywell International Inc., Morristown, NJ (US)

( * ) Notice: Subject to any disclaimer, the term of this patent is extended or adjusted under 35 U.S.C. 154(b) by 707 days.

(21) Appl. No.: 10/646,901

(22) Filed: Aug. 22, 2003

(65) Prior Publication Data

US 2005/0041044 A1 Feb. 24, 2005

(51) Int. Cl.
*G06T 15/00* (2006.01)

(52) U.S. Cl. .................. 345/660; 345/672; 345/680; 701/211

(58) Field of Classification Search ................. 345/619, 345/660–667, 672, 951, 980; 340/951, 980, 340/672; 701/211–214
See application file for complete search history.

(56) References Cited

U.S. PATENT DOCUMENTS

| | | | | | |
|---|---|---|---|---|---|
| 5,583,984 | A | * | 12/1996 | Conrad et al. ............... | 715/769 |
| 6,178,264 | B1 | * | 1/2001 | Kamatani .................... | 382/199 |
| 6,396,507 | B1 | * | 5/2002 | Kaizuka et al. ............. | 345/661 |
| 6,407,749 | B1 | | 6/2002 | Duke | |
| 2002/0149605 | A1 | * | 10/2002 | Grossman ................... | 345/660 |
| 2003/0137674 | A1 | * | 7/2003 | Norita et al. ................ | 356/601 |
| 2004/0001110 | A1 | * | 1/2004 | Khan .......................... | 345/848 |
| 2004/0109006 | A1 | * | 6/2004 | Matthews .................... | 345/619 |
| 2004/0233222 | A1 | * | 11/2004 | Lee et al. .................... | 345/621 |
| 2005/0031197 | A1 | * | 2/2005 | Knopp ........................ | 382/154 |
| 2005/0046615 | A1 | * | 3/2005 | Han ....................... | 342/357.06 |
| 2005/0055330 | A1 | * | 3/2005 | Britton et al. .................. | 707/1 |
| 2005/0188333 | A1 | * | 8/2005 | Hunleth et al. .............. | 715/860 |

FOREIGN PATENT DOCUMENTS

| | | |
|---|---|---|
| EP | 1179769 A | 2/2002 |
| JP | 10141974 A | 5/1998 |

OTHER PUBLICATIONS

Eric W. Weisstein. "Line." From MathWorld—A Wolfram Web Resource. http://mathworld.wolfram.com. 1999, CRC Press LLC.*

(Continued)

*Primary Examiner*—Phu K Nguyen
(74) *Attorney, Agent, or Firm*—Ingrassia, Fisher & Lorenz, P.C.

(57) ABSTRACT

Methods and apparatuses are provided for changing the relative size of an image in a display that includes one or more edges that define a display area in which at least a portion of the image is displayed. The methods and apparatus provide for a zoom point, which corresponds to a point in the displayed image that is to be zoomed in the displayed image, to be selected. The relative size of the selected zoom point may then be changed while the selected zoom point is translated along a substantially straight zoom line that passes through the selected zoom point and extends between a central point in the display area and an edge point on the display area that is closest to the selected zoom point.

30 Claims, 22 Drawing Sheets

OTHER PUBLICATIONS

EPO Search Report WO-PCT/US2004/027089.*
PCT International Search Report: PCT/US2004/027089, Applicant Reference No. H0003570-1623, Aug. 8, 2005, EP International Search Authority, 7 pages.
Anonymous, About the IMAGINE Viewer, Internet Article, 'Online! Jun. 4, 2001. XP002337585. retrieved on Jul. 14, 2005, whole document.

Anonymous, Zooming, Internet Article- 'Online! Jun. 4, 2001, XP002338343, retrieved on Jul. 14, 2005, to prove the publication from XP2337585 and XP002338343, whole document.
Anonymous, Map Results—Infospace, Internet Article—'Online! Jun. 2002, XP002337586, retrieved on Jul. 14, 2005, to prove the publication date from XP002337586, whole document.

* cited by examiner

SYSTEM AND METHOD FOR CHANGING THE RELATIVE SIZE OF A DISPLAYED IMAGE

TECHNICAL FIELD

The present invention generally relates to image display systems and methods and, more particularly, to a system and method for changing the relative size of a displayed image.

BACKGROUND

Various charts are available for pilot use when maneuvering an aircraft from the en route environment down to an airport runway. These charts include, among other things, altitude and heading data that the pilot uses to maneuver and land the aircraft. A separate chart may be provided for each runway at each airport. In many instances, these charts are implemented as paper, or "hard copies," that the pilot can strap to the aircraft yoke, for use during aircraft landing. These charts can be heavy and voluminous, and may additionally be subject to periodic updates, which can result in time-consuming labor to ensure pilots have the most recent charts. Thus, many of these charts have been converted into electronic chart files and stored in a chart database. The charts may then be retrieved from the database and displayed on one or more display screens in an aircraft cockpit.

Presently, most aircraft that use an electronic chart database are equipped with a separate, dedicated chart display system that includes appropriate viewer software. Unfortunately, the screen resolution of such chart displays is, in most instances, not as good as what is provided from the paper charts. Thus, when a chart is displayed it may need to be magnified or "zoomed in on," to improve the readability of the electronic charts on the chart display. To facilitate this functionality, the chart display system in many aircraft includes appropriate software and one or more user input devices such as, for example, a cursor control device (CCD) and a zoom knob, that allows a pilot to zoom in (and back out) on selected portions of a displayed chart.

With the zoom methods presently implemented in most aircraft chart display systems, the object of interest to be zoomed in on is first moved to the center of the display screen, and is then zoomed in on. In one embodiment, once the pilot identifies the object of interest to zoom in on, the pilot then positions the cursor on or near one of the edges of the display screen. When the cursor is placed on the display screen edge, a graphical scroll interface is displayed and, once the CCD receives an appropriate user input (e.g., a button is "clicked"), the chart may be scrolled in various directions. Once the scroll interface is displayed, the object of interest is then moved to the center of the display screen using the CCD or other user interface. Thereafter, the zoom knob is turned until the desired magnification level is achieved.

In another zoom method embodiment, the pilot first places the cursor over the object of interest, and supplies an appropriate user input to the CCD. Upon receipt of the user input, a menu is displayed that includes various selectable options. One of the selectable options is a "Center Chart" option, which, upon selection using the CCD, moves the entire chart so that the object of interest is positioned at the center of the display area. Thereafter, the zoom knob is turned until the desired magnification level is achieved.

Although the chart image displays and the above-described zoom methods are generally safe and reliable, and result in the zoom object being centered in the display area, each suffers certain drawbacks. For example, each of the above-described methods can result in relatively large amounts of display space (up to 75%) being unused during the zoom process. These methods frequently involve multiple steps to get the desired image displayed, which can be time consuming. A significant amount of processing time and resources can also be used in implementing these methods. Moreover, the methods can result in orientation difficulties when zoomed in.

Accordingly, it is desirable to provide a chart display system and method for displaying and zooming charts that does not result in unused display space during zooming, and/or does not involve multiple steps, and/or does not use significant amounts of processing time and/or resources, and/or does not result in orientation difficulties. The present invention addresses one or more of these needs. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides a display system and a method of changing the relative size of images displayed in the display system. The system and associated method uses the entire display space during zooming, and minimizes multiple user inputs. Moreover, the system and method provide appropriate image orientation cues to a user while the size of the displayed image is being changed.

In one embodiment, and by way of example only, in a display including one or more edges that define a display area in which at least a portion of an image is displayed, a method of changing the relative size of the image includes selecting a zoom point in the displayed image, which corresponds to a point in the displayed image that is to be zoomed. The relative size of the zoom point is changed while the zoom point is translated along a substantially straight zoom line that passes through the zoom point and extends between a central point in the display area and an edge point on the display area that is closest to the zoom point.

In another exemplary embodiment, a display device includes a user input device, a display screen, and a processor. The user input device is operable to receive user input and supply one or more command signals. The display screen has one or more edges that define an image display area in which a displayed image may be rendered. The processor is coupled to receive the commands from the user input device and is operable, in response thereto, to: (i) select a zoom point in the displayed image that corresponds to a point in the displayed image that is to be zoomed; and (ii) change the relative size of the zoom point while translating the zoom point along a substantially straight zoom line that passes through the zoom point and extends between a central point in the display area and an edge point on the display area that is closest to the zoom point.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, although the system and methodology are described as being implemented in an aircraft environment, and used for displaying, and changing the depicted size of, aircraft-related charts, it will be appreciated that the system and method could be implemented in various other end-use environments that include various types of displays including, but not limited to, various types of automotive, spacecraft, watercraft, home, and office environments.

Figure 1:
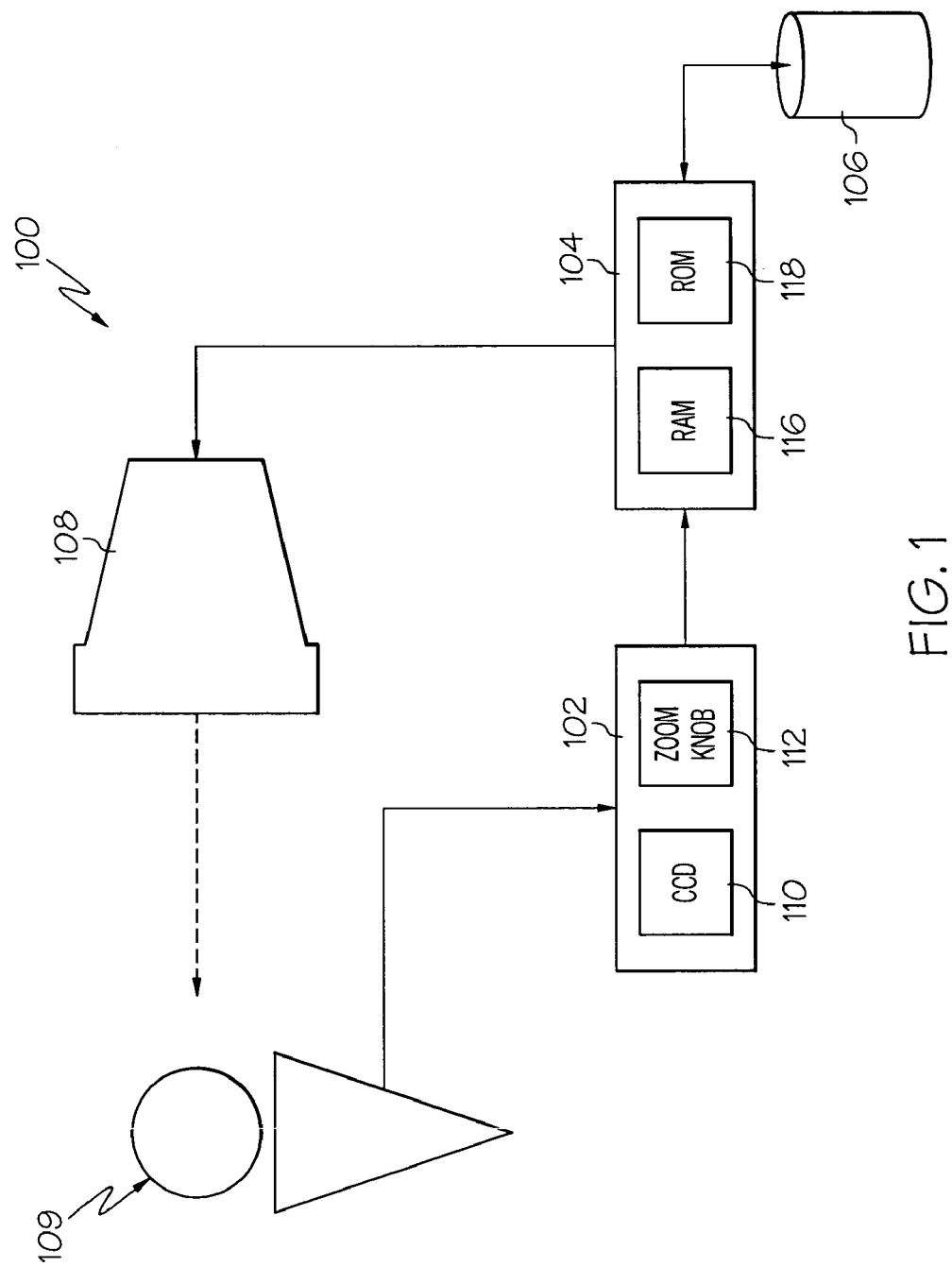
FIG. 1 is a block diagram of an exemplary display system that may be used to display images, such as aircraft-related charts.

Turning now to the description, and with reference to FIG. 1, an exemplary display system will be described. The display system 100 includes a user interface 102, a processor 104, an image database 106, and a display 108. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 110, such as a mouse, a trackball, a touchpad, a force-rate transducer, or joystick, and one or more buttons, switches, or knobs. In the depicted embodiment, the user interface 102 includes a CCD 110 and a zoom control knob 112. As will be described more fully below, the user 109 uses the CCD 110 to, among other things, move a cursor symbol on the display screen (not shown in FIG. 1), and the zoom control knob 112 to selectively change the relative size of an image displayed on the display screen.

The processor 104, as was just noted, is in operable communication with, and receives user input commands from, the user interface 102. The processor 104 is additionally in operable communication with the image database 106, and with the display 108. The processor 104 receives the user input commands supplied from the user interface 102 and is configured, in response to these user input commands, to selectively retrieve images from the image database 106 and display the retrieved images on the display 108. The processor 104 is additionally configured, in response to the user input commands, to selectively change the relative size of the displayed image.

The processor 104 may be any one of numerous known general purpose microprocessors or an application specific processor that operates in response to program instructions. In the depicted embodiment, the processor 104 includes on-board RAM (random access memory) 116, and on-board ROM (read only memory) 118. The program instructions that control the processor 104 may be stored in either or both the RAM 116 and the ROM 118. For example, the operating system software may be stored in the ROM 118, whereas various operating mode software routines and various operational parameters may be stored in the RAM 116. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The image database 106 includes data representative of various images. In the depicted embodiment, the image data is representative of various flight-related charts and textual data. In particular, the image data is representative of various airport approach charts and associated text. It will be appreciated that, although the image database 106 is, for clarity and convenience, shown as being stored separate from the processor 104, the database 106 could be loaded into the on-board RAM 116, or the database 106 could be integrally formed as part of the processor 104, and/or RAM 116, and/or ROM 118. The image database 106 could also be part of a device or system that is physically separate from the display system 100.

The display 108 is used to display images stored in the image database 106, and to supply visual feedback to the user 109 in response to the user input commands supplied by the user 109 to the user interface 102. It will be appreciated that the display 108 may be any one of numerous known displays suitable for rendering image and/or text data for viewing by the user 109. Non-limiting examples of such displays include various cathode ray tube (CRT) displays, and various flat panel displays, such as various types of LCD (liquid crystal display) and TFT (thin film transistor) displays. To provide a more complete description of the method that is implemented by the display system 100 to change the relative size of the images displayed on the display 108, a brief general description of the display 108 and its layout will now be provided.

Figure 2:
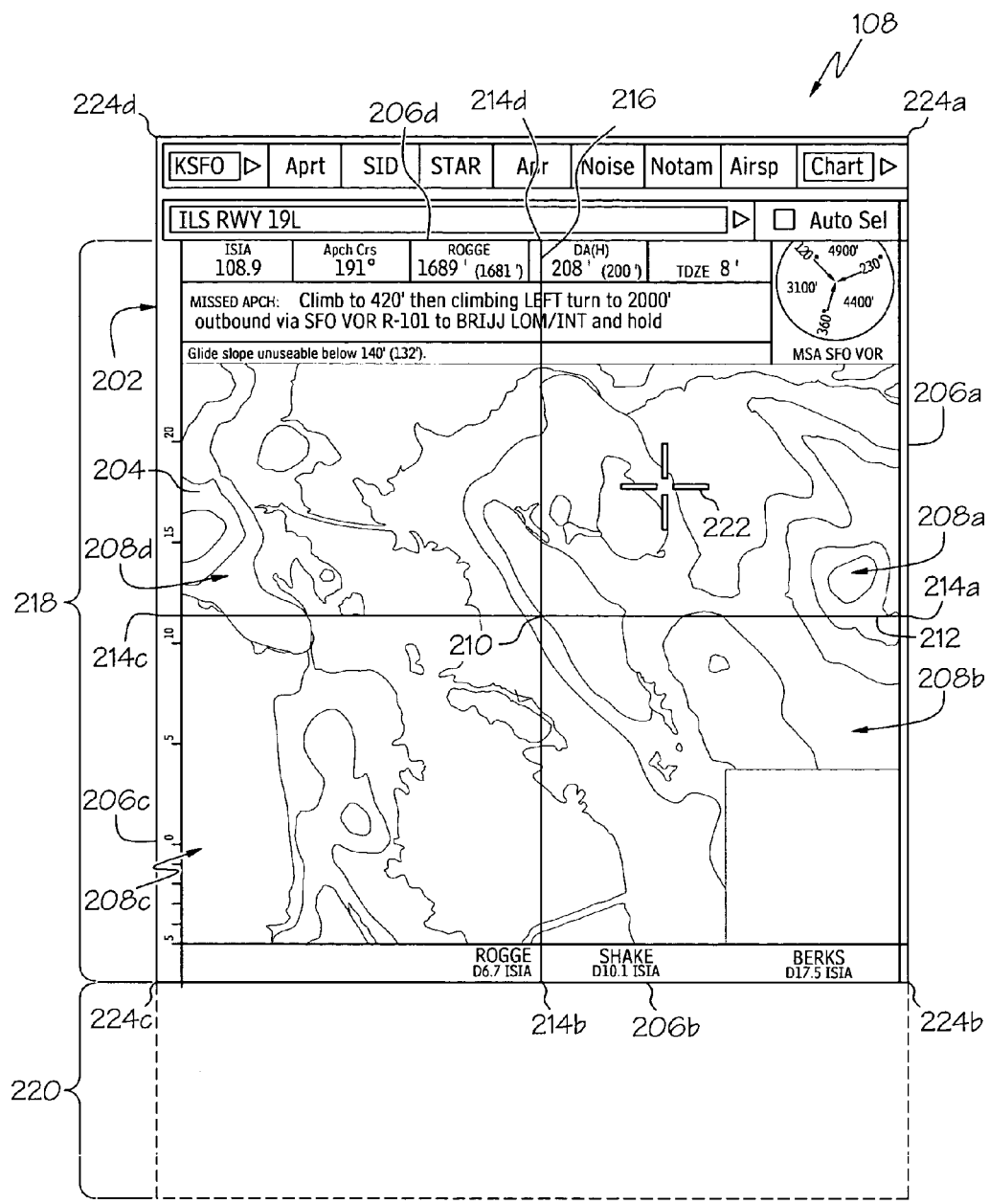
FIG. 2 is an exemplary display screen that may be used in the system of FIG. 1, which shows the overall layout of the display screen, and on which is displayed an image of a chart that may be used by pilots during airport approach.

With reference to FIG. 2, it seen that the display 108 includes a display area 202 in which an image 204 is displayed and viewed. In the depicted embodiment, the display area 202 is substantially square, and includes four display area edges 206a-d. The display area 202 is divided into four substantially equal quadrants 208a-d by two imaginary lines that intersect at a central point 210 in the display area 202. In particular, an imaginary horizontal line 212 extends between a midpoint 214a of the first display area edge 206a and a midpoint 214c of the third display area edge 206c. Similarly, an imaginary vertical line 216 extends between a midpoint 214b of the second display edge 206b and a midpoint 214d of the fourth display area edge 206d. It should be appreciated that, although a substantially square display area 202 is described and depicted, since such a shape is preferred, other display area shapes could also be used.

As FIG. 2 also illustrates, the displayed image 204 may be of a size and/or resolution such that the entire image 204 cannot be simultaneously viewed in the display area 202. In such instances, the image 204 includes a viewable section 218 that is presently viewable in the display area 202, and one or more non-viewable sections 220 (shown in phantom) that are presently not viewable in the display area 202. Thus, the display system 100 preferably implements an image scroll function, which allows the displayed image 204 to be scrolled in either, or both, the horizontal and vertical directions, so that some or all of the viewable section 218 becomes non-viewable and, vice-versa, some or all of the non-viewable sections 220 become viewable. The scroll function implemented by the display system 100 may be any one of numerous scroll functions known in the art. The display system 100 also causes a cursor symbol 222 to be selectively displayed in the display area 202. The cursor symbol 222 may be moved using the CCD 110.

Figure 3A:
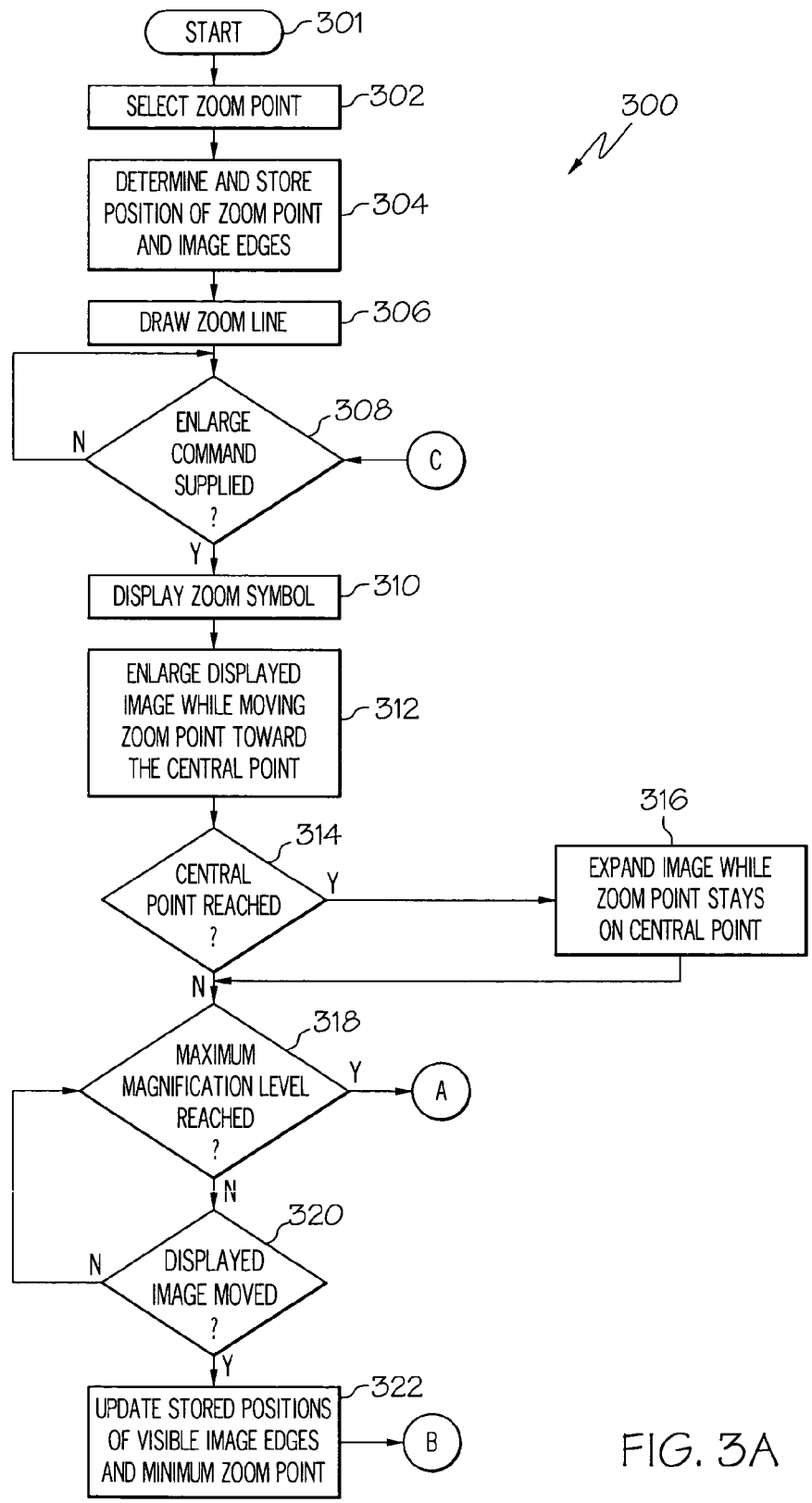
FIGS. 3A and 3B together form a flowchart that depicts the an exemplary embodiment of the process implemented by the system of FIG. 1 to change the relative size of an image that is displayed on the display screen of FIG. 2.
Figure 3B:
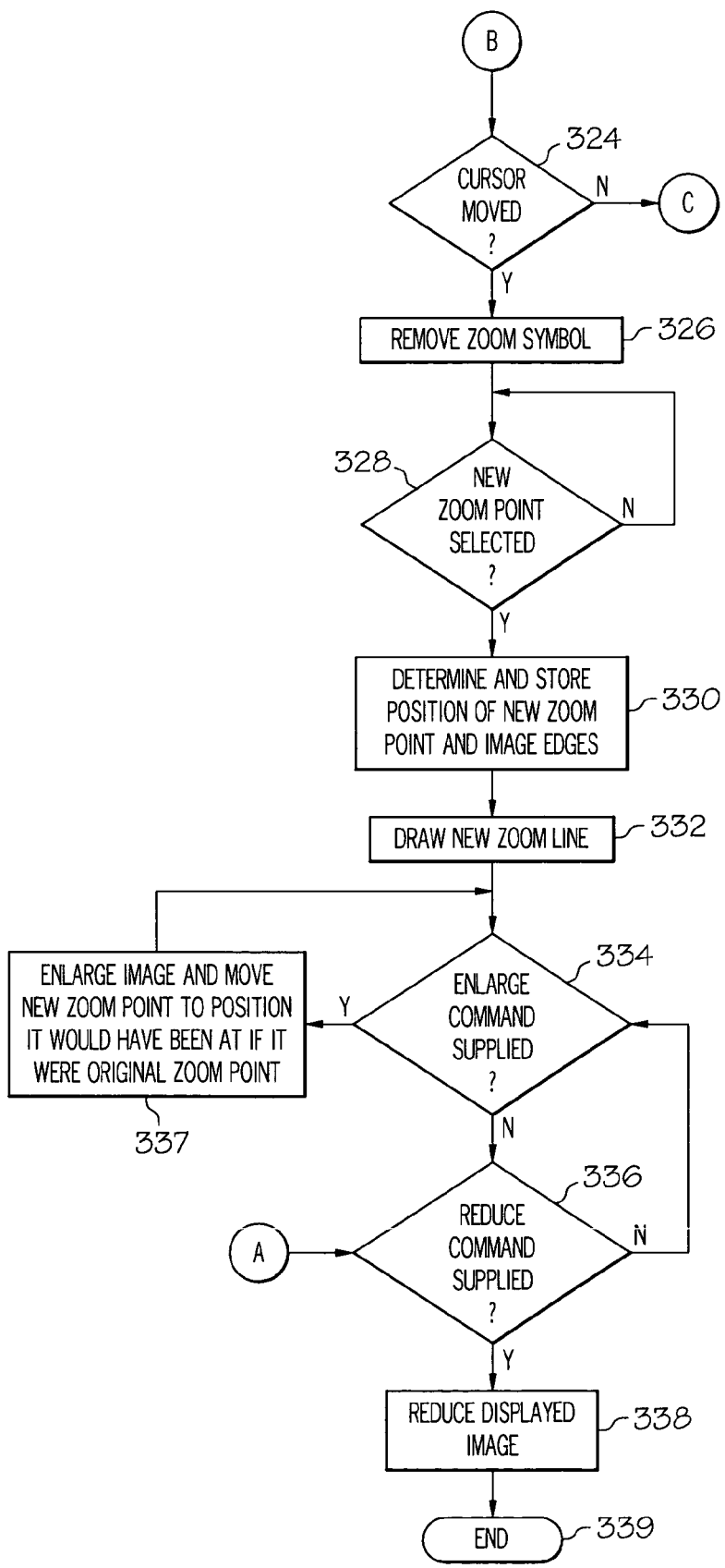

The display system 100 allows an operator such as, for example, the pilot 109, to change the relative size of the displayed image 204. The overall process 300 implemented by the system 100 to change the relative size of the displayed image 204 is illustrated in flowchart form in FIGS. 3A and 3B, and will now be described in detail. In doing so, reference should be made, as appropriate, to FIGS. 1, 2, and 4-12, in combination with FIGS. 3A and 3B. Moreover, it will be appreciated that the parenthetical references in the following description refer to like reference numerals in the flowchart. Moreover, as was previously noted, although the example depicted and described below relates to airport approach charts in an aircraft environment, it will be appreciated that it could be implemented in various environments, including other aircraft systems and numerous non-aircraft end-use environments.

Figure 4:
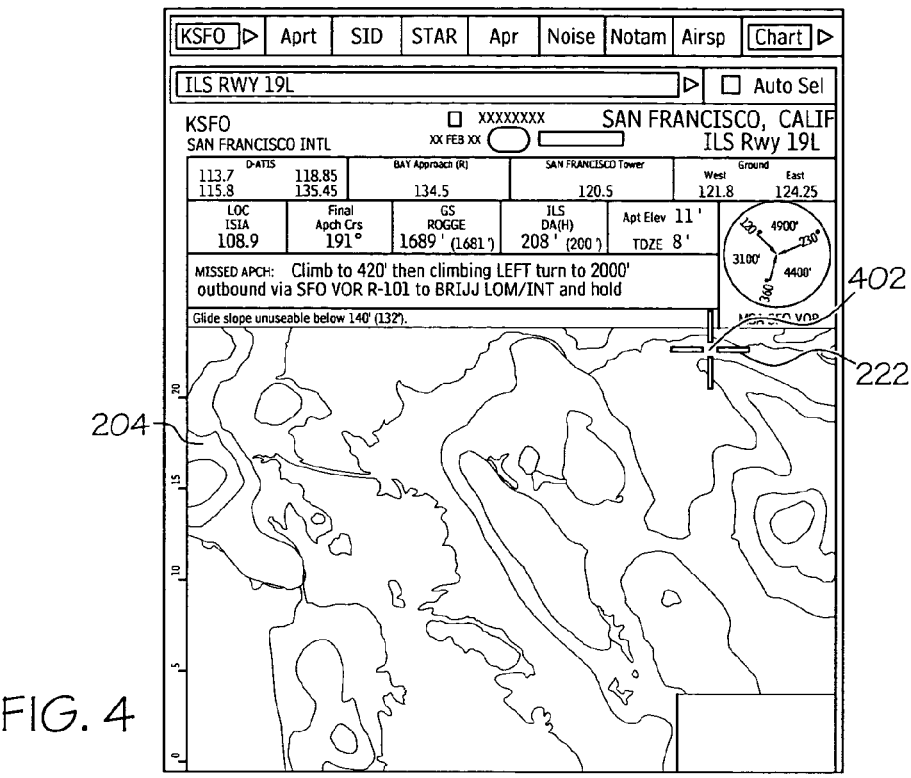
FIGS. 4-12 are exemplary display screens that may be used in the system of FIG. 1, on which is displayed an image of a chart that may be used by pilots during airport approach, and with the displayed image being shown at ever-increasing levels of magnification.

Turning first to FIG. 4, the image 204 that is displayed in the display area 202 of the display 108 is an airport approach chart. In the depicted example, the pilot 109 is interested in zooming in on a particular non-illustrated obstacle. Thus, the pilot 109, using the CCD 110, moves the cursor symbol 222, places it over this point of interest on the displayed image 204, and selects this point as the zoom point 402 (302). In the depicted embodiment, placing the cursor symbol 222 over a point of interest automatically selects it as the zoom point 402. It will be appreciated that in an alternative embodiment, additional user input may be used to select the zoom point 402. For example, clicking on a button on the CCD 110 may be used as the additional user input. In any case, after the zoom point 402 has been selected (302), the processor 104 determines the positions of the zoom point 402 and the visible image edges and stores these positions in memory (304). The reason for this will be explained more fully further below.

Figure 5:
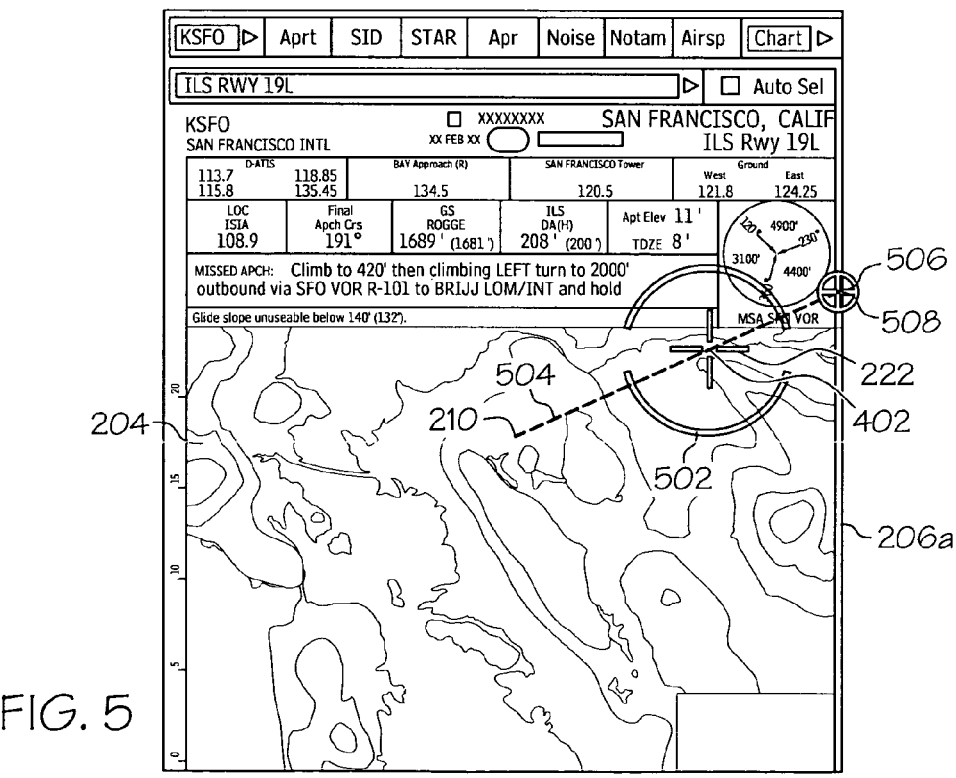
Figure 6:
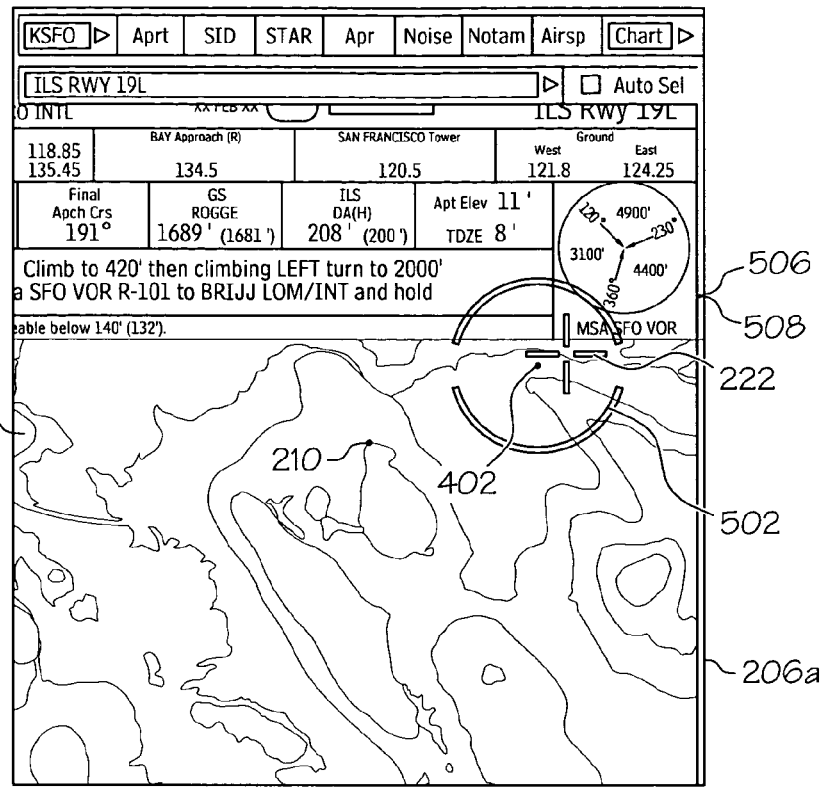
Figure 7:
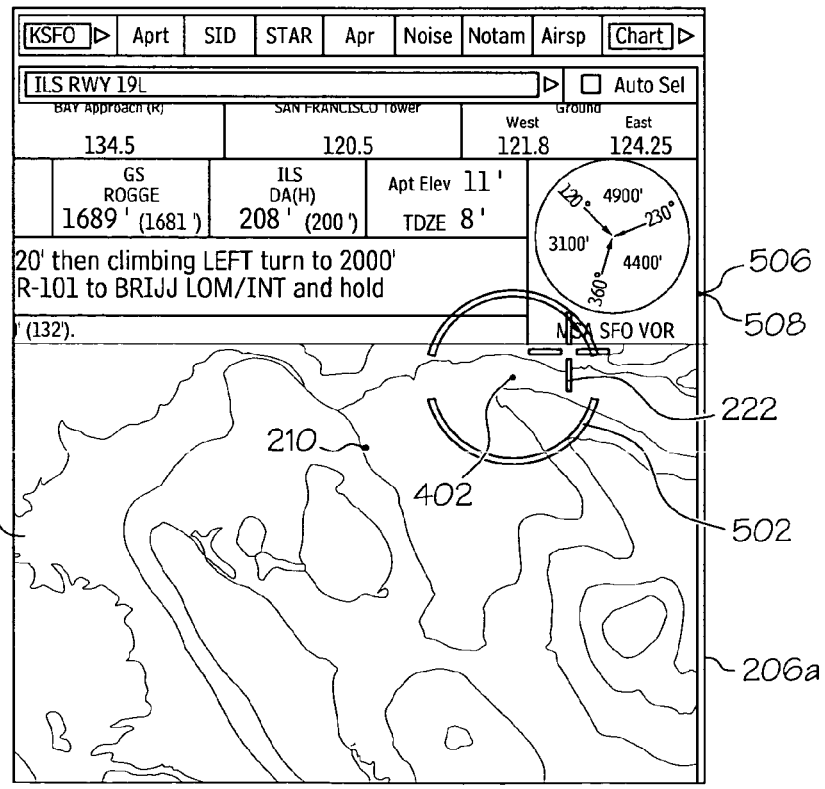
Figure 8:
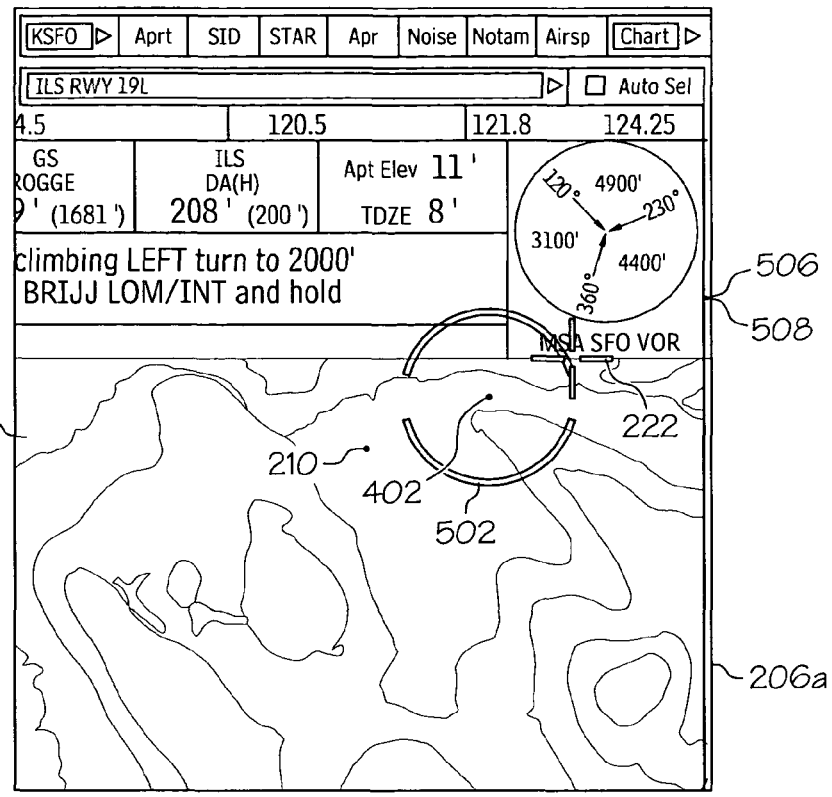
Figure 9:
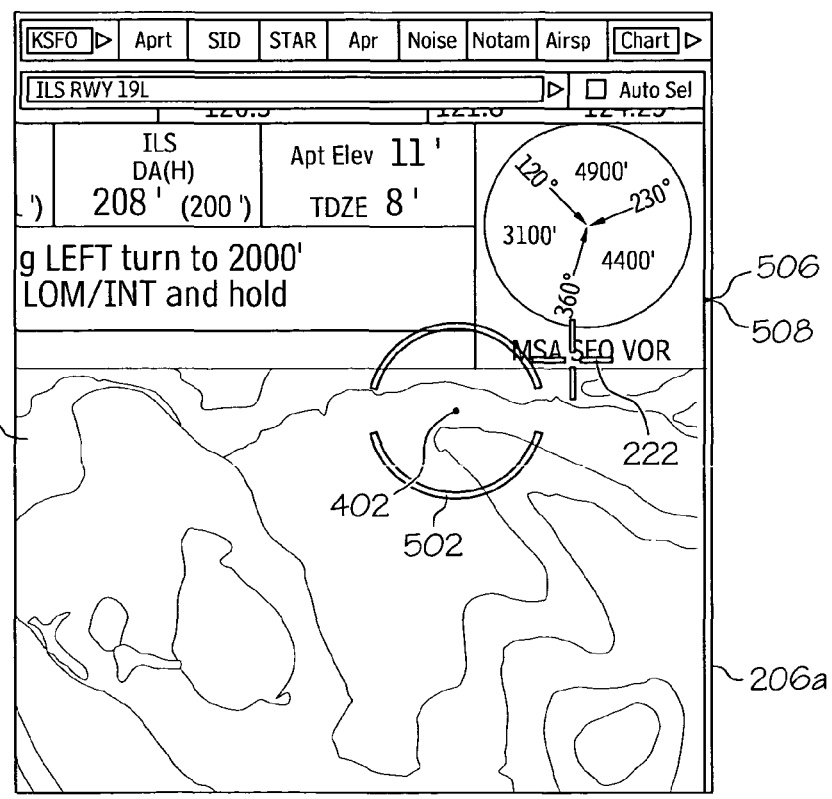

Turning now to FIG. 5, it is seen that once the zoom point 402 has been selected the processor 104 draws an imaginary zoom line 504 (shown in phantom) that extends between the display area central point 210 and an edge point 506 located on the display area edge 206 that is closest to the zoom point 402, and that passes through the zoom point 402 (306). Thus, in the present example, the display area edge point 506 is on the first display area edge 206a, and the zoom line 504 extends between this point 506 and the central point 210. As FIG. 5 additionally shows, the displayed image 204 includes an image edge point 508 that coincides with the display area edge point 506. As will be clarified further below, this image edge point 508 is "bound" to the display area edge point 506 when the relative size of the image 204 is being changed. In other words, when the relative size of the image 204 is being changed, the position of the image point 508 that corresponds with the edge point 506 will be maintained.

After the zoom line 504 has been drawn (306), and in response to appropriate input from the pilot 109 (308), such as turning the zoom knob 112 in the appropriate direction, the processor 104 causes a zoom symbol 502 to appear in the display area 202 (310), and begins zooming in on the selected zoom point 402 (312). As shown in FIGS. 6-10, which depict the displayed image 204 at increasing levels of magnification, as the relative size of the displayed image 204 increases, the zoom point 402 translates along the imaginary zoom line 504 toward the central point 210 (312). It will be noted that, in the depicted example, the cursor symbol 222 remains in its original position while the image 204 is enlarged, unless the user 109 moves it using the CCD 110. However, the zoom symbol 502 moves with the zoom point 402 as it translates toward the central point 210. This provides a ready means to continuously determine the location of the zoom point 402 during image enlargement. In the depicted embodiment, it is seen that the zoom symbol 502 is made up of two half-circles that, in combination, substantially surround the selected zoom point 402. It will be appreciated that this is merely exemplary of a particular representation of the zoom symbol 502, and that other shapes, sizes, and configurations could also be used. It will additionally be appreciated that the processor 104 could cause the zoom symbol 502 to automatically appear upon selection of the zoom point 402.

As was noted above, and as can be seen in FIGS. 6-10, while the image 204 is enlarging, the image edge point 508 remains in its initial position as the size of the image 204 increases. In addition, the entire edge of the image 204 that includes the image edge point 508 remains aligned with the display area edge 206 (206a in the present example). However, the edges of the displayed image 204 that do not include the image edge point 508 expand out of the display area 202, and become non-viewable sections 220 (not shown in FIGS. 6-10). More specifically, and as illustrated most clearly in FIG. 11, the image 204 is expanded around the image edge point 508, and along a first directional vector 1102, a second directional vector 1104, and a third directional vector 1106, which together provide a resultant directional vector 1108 that coincides with the imaginary zoom line 504. This multi-directional expansion of the image 204 around the image edge point 508 gives the net effect of moving the zoom point 402 toward the central point 210, and which can be described mathematically as:

$$\text{DISTANCE}_{zoom\ point} = (\text{MAG}_{level}) \times (\text{DISTANCE}_{orginal})$$

where:
$\text{DISTANCE}_{zoom\ point}$=distance the zoom point moves;
$\text{MAG}_{level}$=magnification level in %; and
$\text{DISTANCE}_{original}$=distance from edge point to zoom point at 100% magnification level.

Figure 10:
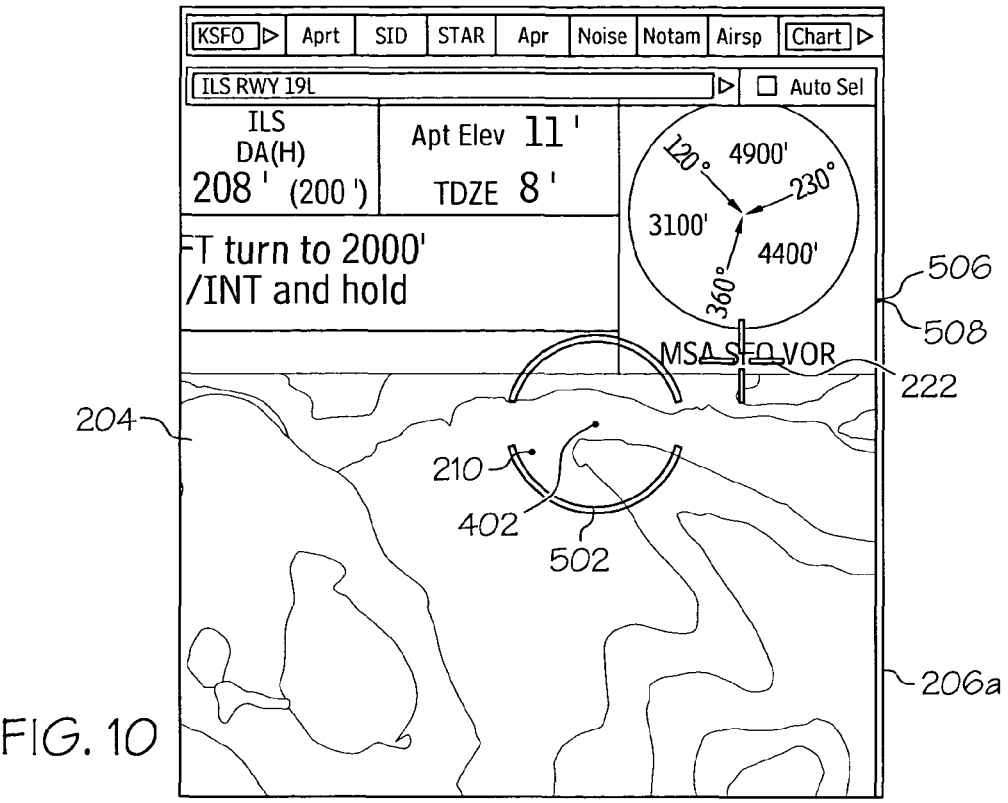
Figure 11:
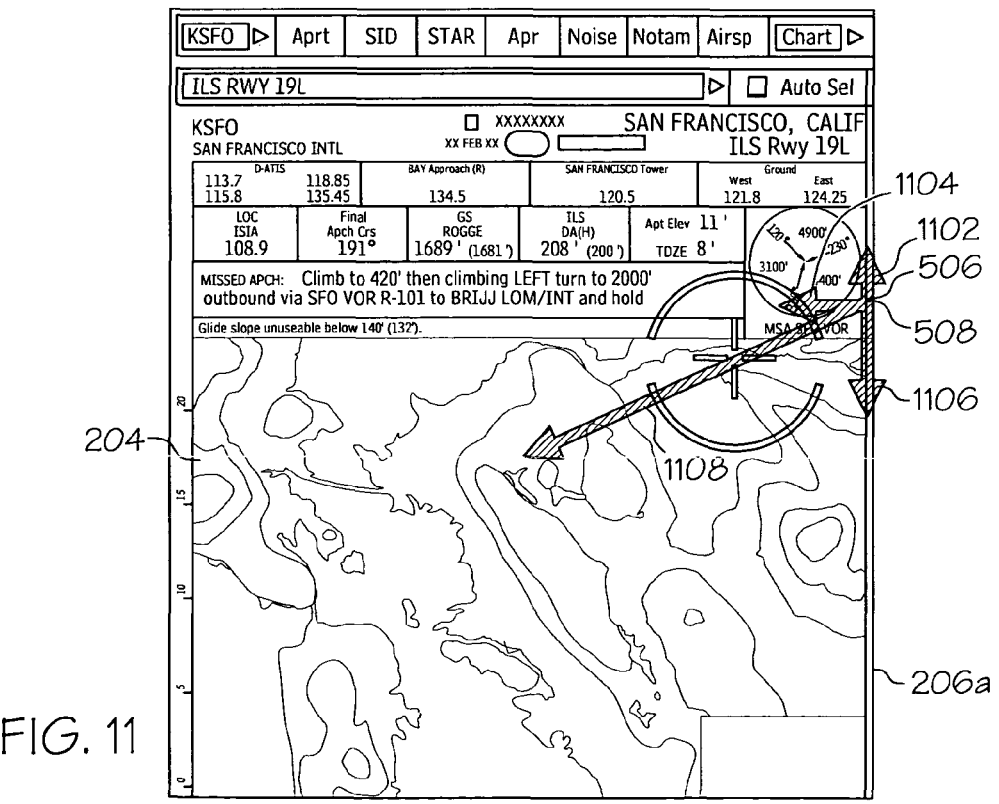

As long as the user 109 continues requesting that the image 204 be enlarged (310), the processor 104 will continue enlarging the image 204, and the zoom point 402 will continue moving toward the central point 210 according to the above-mentioned mathematical description (312), until one of two things occur. First, the processor 104 will not enlarge the image 204 further if a predetermined maximum magnification level is attained, even if the zoom point 402 has not reached the central point 210 (318). Second, if the zoom point 402 reaches the central point 210 before the desired, or maximum, magnification level is attained (314), the zoom point 402 will remain fixed at the central point 210 for the remainder of the image enlargement (316). Referring momentarily back to FIG. 10, it is seen that for the depicted example the maximum magnification level was attained before the selected zoom point 402 reached the central point 210.

Figure 12:
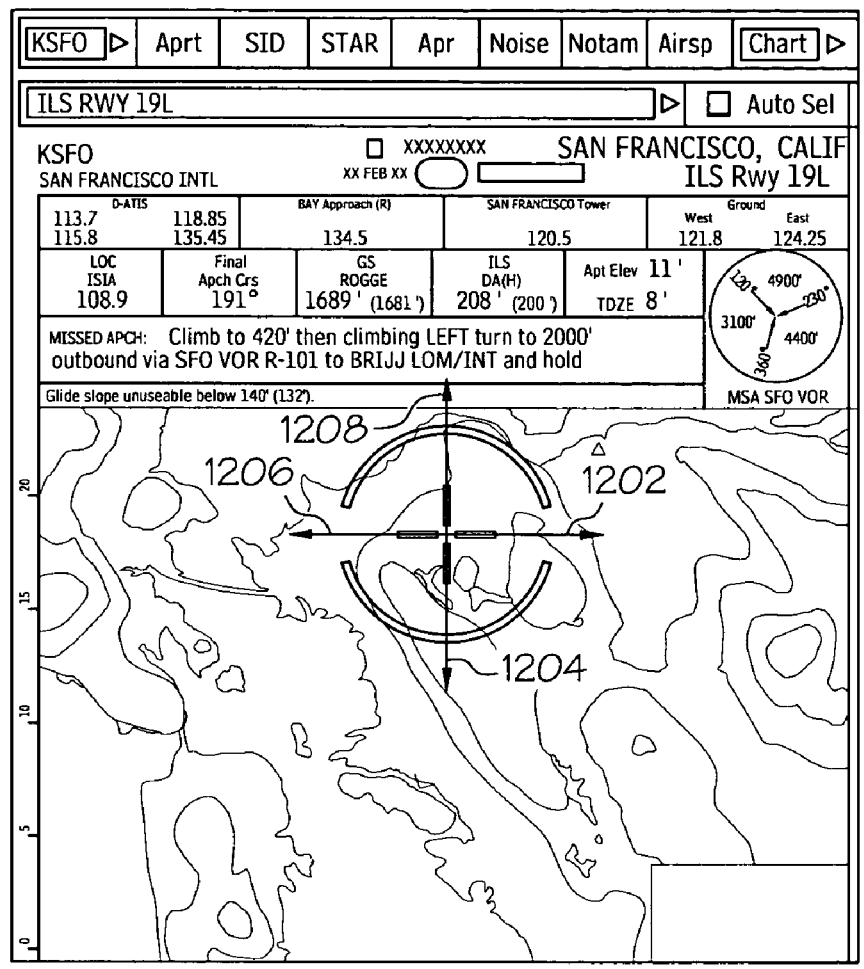

It was noted that above that, upon selection of the zoom point 402, its original position is determined and stored. One of the reasons this is done is to determine whether the selected zoom point 402 is substantially collocated at a point such that no single display area edge 206 is the closest. For example, if the zoom point 402 is substantially collocated with the central point 210, then each of the display edges 206a-d is equidistant from the zoom point 402. Or, if the zoom point 402 is located along an imaginary line that extends from the central point 210 to a corner 224a-d (see FIG. 2) of the display area 202, then no single display edge 206a-d is the closest. For the first-mentioned case, in which the zoom point 402 is located at the central point 210, it will be appreciated that there is no need to move the zoom point 402 toward the central point 210, since that is where it is already located. In such an instance, as illustrated in FIG. 12, the image 204 is expanded multi-directionally around the central point 210, along first 1202, second 1204, third 1206, and fourth 1208 directional vectors (316). For the latter case, in which the zoom point 402 is located along an imaginary line that extends from the central point 210 to a display area corner 224, the display edge point 506 and image edge point 508 are each located on the display area corner 224, and the image 204 is expanded as previously described (312-318).

It was additionally noted above that portions of the displayed image 204 expand out of the display area 202, and become non-viewable 220, as the image 204 is enlarged. The amount of the displayed image 204 that becomes non-viewable 220 during image enlargement depends on various factors, and can also be expressed mathematically. Before proceeding with the description of the remainder of the process 300, these factors and some exemplary illustrations will first be provided. Specifically, the amount of the displayed image 204 that becomes non-viewable 220 during image enlargement depends on four factors: (1) the location of the display area edge point 506; (2) the magnitude of the enlargement; (3) the pre-enlargement vertical and horizontal dimensions of the image 204; and (4) the amount of the image 204 that is non-viewable 220 prior to image enlargement.

Figure 13:
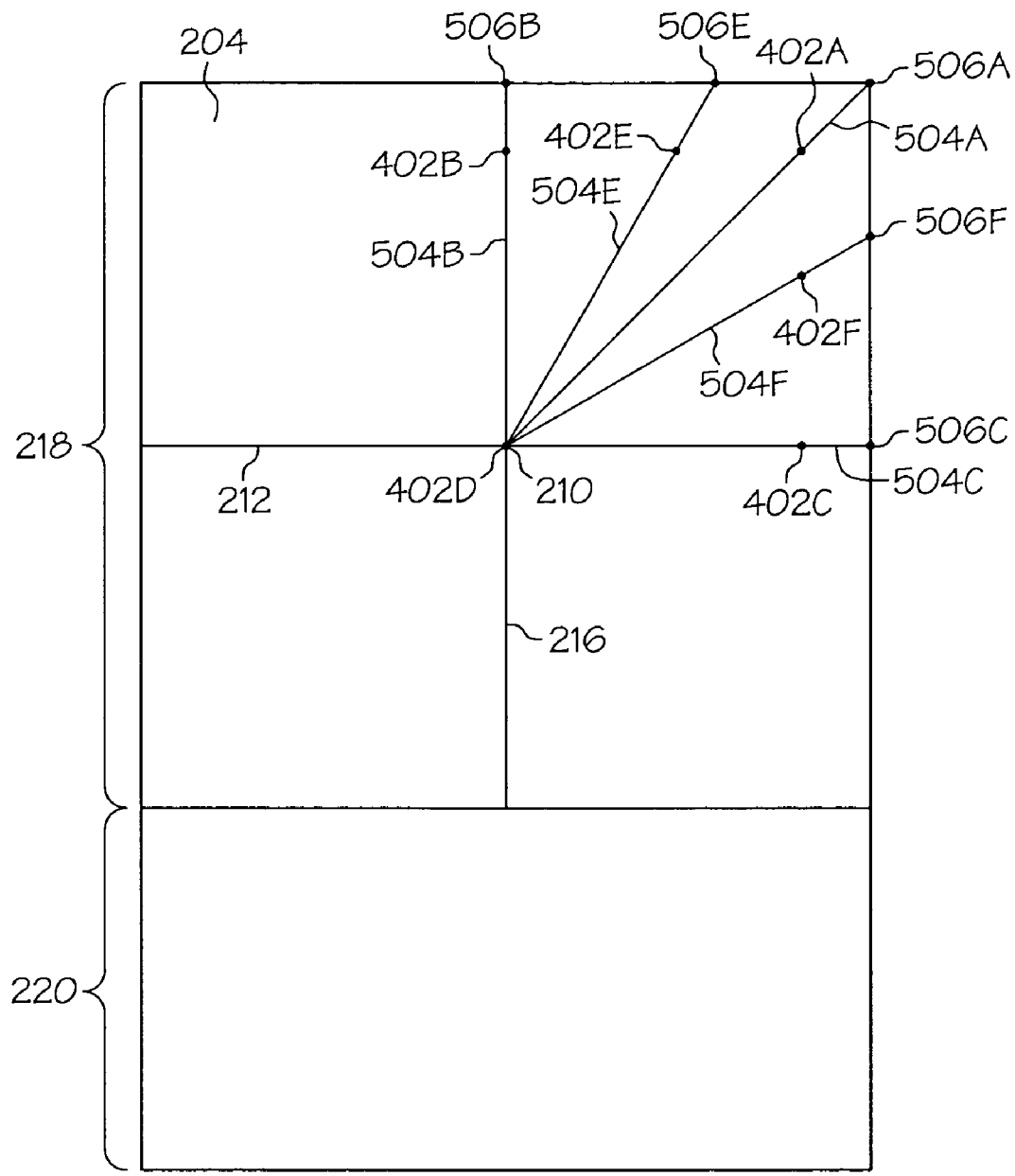
FIGS. 13-19 are simplified representations of the display screen shown in FIG. 2 that show how a displayed image is enlarged based on different selected points in the image.
Figure 14:
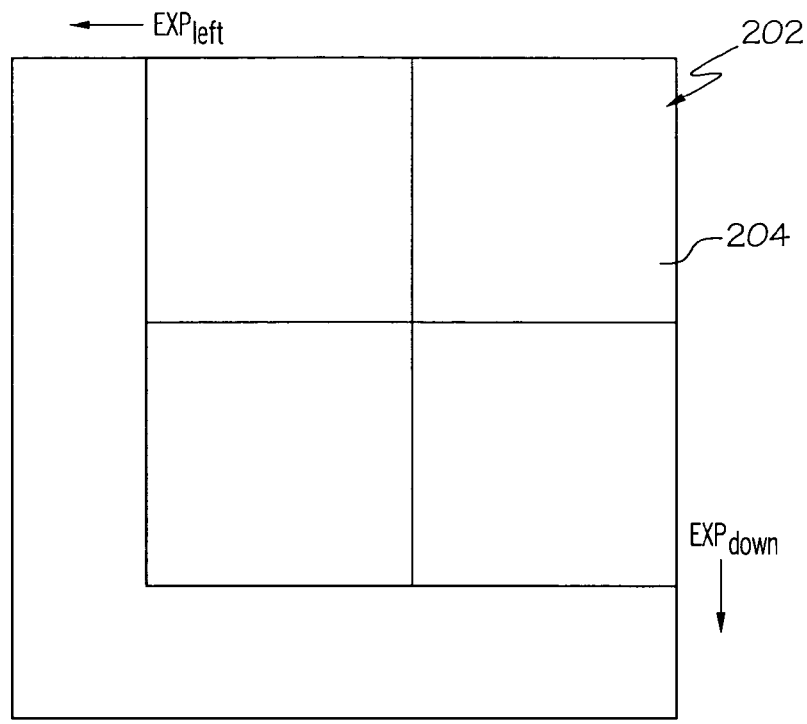

Turning now to FIGS. 13-19, six representative examples of image enlargements will be described. With reference first to FIG. 13, a simplified representation of the display area 202, is provided, and includes the image 204, the central point 210, and the imaginary horizontal 212 and vertical 216 lines. A plurality of image zoom points, specifically a first 402A, a second 402B, a third 402C, a fourth 402D, a fifth 402E, and a sixth 402F zoom point, are also depicted. Each of the six zoom points, with the exception of the fourth zoom point 402D, has an associated edge point 506A, 506B, 506C, 506E, and 506F, and an associated imaginary zoom line 504A, 504B, 504C, 504E, and 504F. The first zoom point 402A is positioned such that its associated edge point 506A is located at the display area corner 224a; thus, the first imaginary zoom line 504A extends from the central point 210 to the corner 224a. As the image 204 is enlarged, as shown in FIG. 14, the image 204 expands to the left and downward. The magnitude of the expansion to the left ($EXP_{left}$) and downward ($EXP_{down}$) may be expressed as:

$$EXP_{left}=(MAG_{level}) \times (WIDTH_{chart}); \text{ and}$$

$$EXP_{down}=(MAG_{level}) \times (HEIGHT_{chart}),$$

where:
$MAG_{level}$=magnification level in %;
$WIDTH_{chart}$=original chart width; and
$HEIGHT_{chart}$=original chart height.

Figure 15:
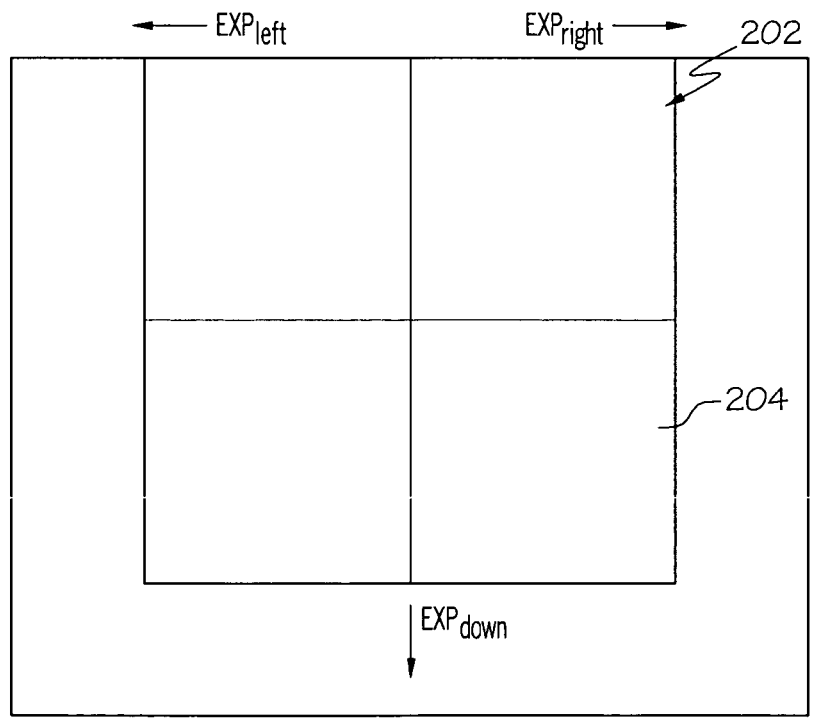

The second zoom point 402B lies along the imaginary vertical line 216. Hence, the second imaginary zoom line 504B extends from the central point 210 to the second edge point 506B, and is aligned with the imaginary vertical line 216. As FIG. 15 shows, when the image 204 is enlarged, it expands to the left, to the right, and downward. The magnitude of the expansion to the left ($EXP_{left}$), right ($EXP_{right}$), and downward ($EXP_{down}$) may be expressed as:

$$(EXP_{left})=(\tfrac{1}{2}) \times (MAG_{level}) \times (WIDTH_{chart});$$

$$(EXP_{right})=(\tfrac{1}{2}) \times (MAG_{level}) \times (WIDTH_{chart}); \text{ and}$$

$$(EXP_{down})=(MAG_{level}) \times (HEIGHT_{chart}),$$

where:
$MAG_{level}$=magnification level in %;
$WIDTH_{chart}$=original chart width; and
$HEIGHT_{chart}$=original chart height.

Figure 16:
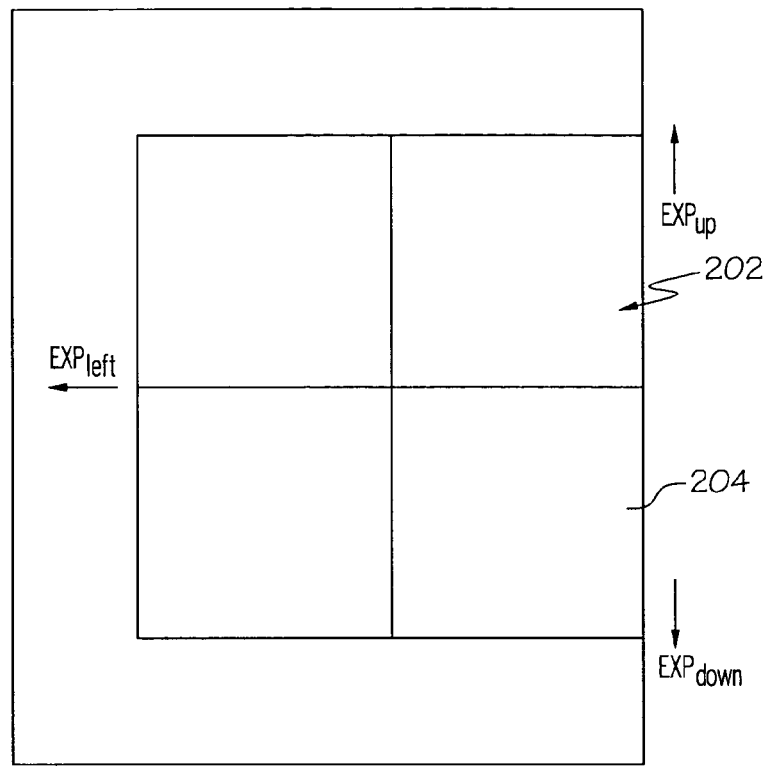
Figure 17:
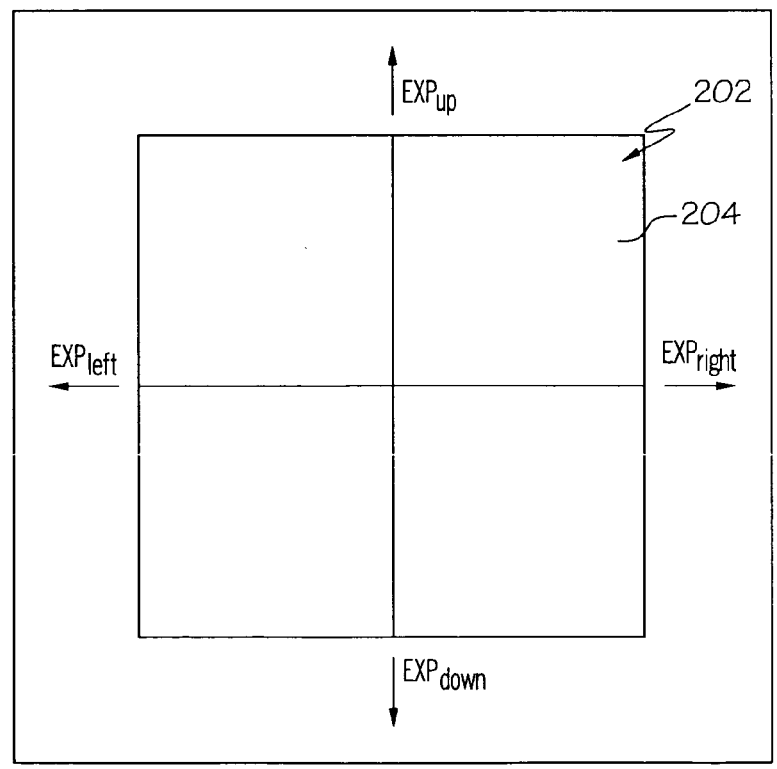

The third zoom point 402C lies along the imaginary horizontal line 214. Hence, the third imaginary zoom line 504C extends from the central point 210 to the third edge point 506C, and is aligned with the imaginary horizontal line 214. When the image 204 is enlarged, as shown in FIG. 16, it expands to the left, upward, and downward. The magnitude of the expansion to the left ($EXP_{left}$), upward ($EXP_{up}$), and downward ($EXP_{down}$) may be expressed as:

$$(EXP_{left})=(MAG_{level}) \times (WIDTH_{chart});$$

$$(EXP_{up})=(\tfrac{1}{2}) \times (MAG_{level}) \times (HEIGHT_{chart}); \text{ and}$$

$$(EXP_{down})=(\tfrac{1}{2}) \times (MAG_{level}) \times (HEIGHT_{chart}),$$

where:
$MAG_{level}$=magnification level in %;
$WIDTH_{chart}$=original chart width; and
$HEIGHT_{chart}$=original chart height.

The fourth zoom point 402D, as shown in FIG. 13, coincides with the central point 210. Thus, as was previously mentioned, when the image 204 is enlarged, it expands upward, downward, to the left, and to the right. The magnitude of the expansion upward ($EXP_{up}$), downward ($EXP_{down}$), left ($EXP_{left}$), and right ($EXP_{right}$) may be expressed as:

$$(EXP_{up})=(\tfrac{1}{2}) \times (MAG_{level}) \times (HEIGHT_{chart});$$

$$(EXP_{down})=(\tfrac{1}{2}) \times (MAG_{level}) \times (HEIGHT_{chart});$$

$$(EXP_{left})=(\tfrac{1}{2}) \times (MAG_{level}) \times (WIDTH_{chart}); \text{ and}$$

$$(EXP_{right})=(\tfrac{1}{2}) \times (MAG_{level}) \times (WIDTH_{chart}),$$

where:
$MAG_{level}$=magnification level in %;
$WIDTH_{chart}$=original chart width; and
$HEIGHT_{chart}$=original chart height.

Figure 18:
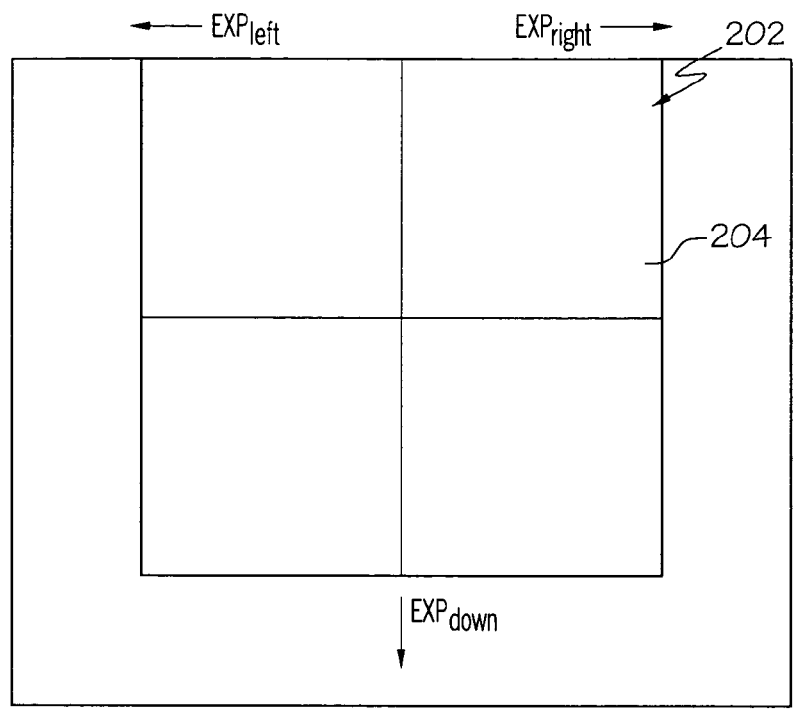

The fifth 402E and sixth 402F zoom points have imaginary zoom lines 504E and 504F, respectively, that extend from the central point 210 to its associated edge point 506E and 506F. For the fifth zoom point 402E, as FIG. 18 shows, when the image 204 is enlarged it expands to the left, to the right, and downward. The magnitude of the expansion upward to the left ($EXP_{left}$), the right ($EXP_{right}$), and downward ($EXP_{down}$) may be expressed as:

$$(EXP_{left})=(MAG_{level})\times(WIDTH_{chart})\times(DISTANCE_{left\ edge\text{-}to\text{-}edge\ point}/WIDTH_{display\ area});$$

$$(EXP_{right})=(MAG_{level})\times(WIDTH_{chart})\times(DISTANCE_{right\ edge\text{-}to\text{-}edge\ point}/WIDTH_{display\ area});\text{ and}$$

$$(EXP_{down})=(MAG_{level})\times(HEIGHT_{chart}),$$

where:
 $MAG_{level}$=magnification level in %;
 $WIDTH_{chart}$=original chart width;
 $HEIGHT_{chart}$=original chart height;
 $DISTANCE_{left\ edge\text{-}to\text{-}edge\ point}$=distance from left display area edge to the edge point,
 $DISTANCE_{right\ edge\text{-}to\text{-}edge\ point}$=distance from right display area edge to the edge point,
 $WIDTH_{display\ area}$=the width of the display area.

Figure 19:
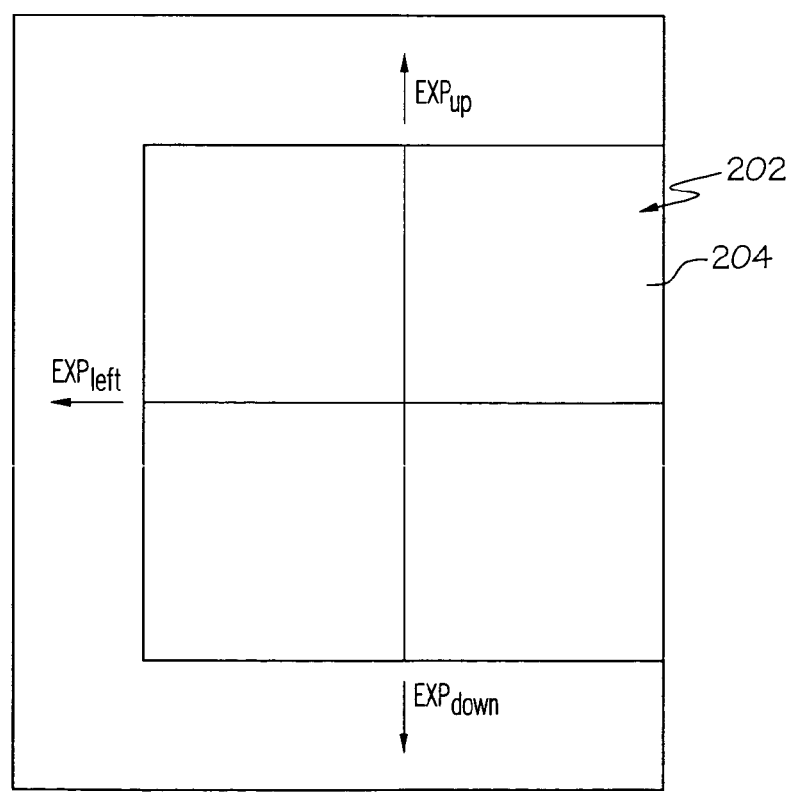
Figure 20:
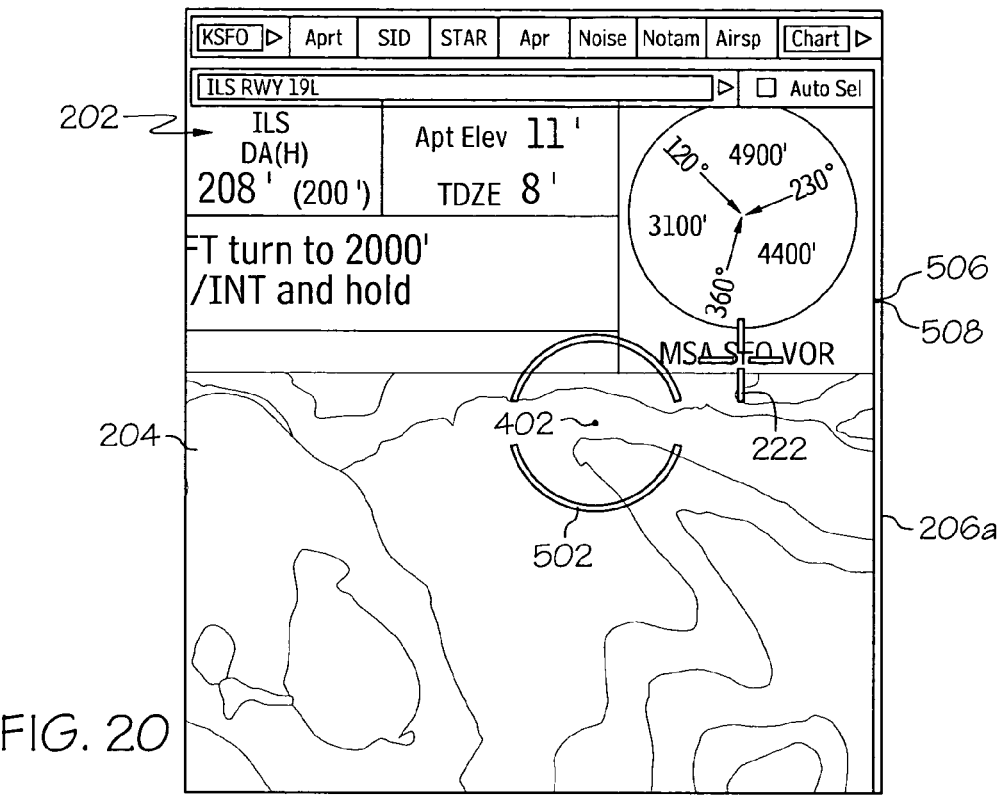
FIGS. 20-25 are similar to FIGS. 4-12, but with the displayed image being shown at ever-decreasing levels of magnification.
Figure 21:
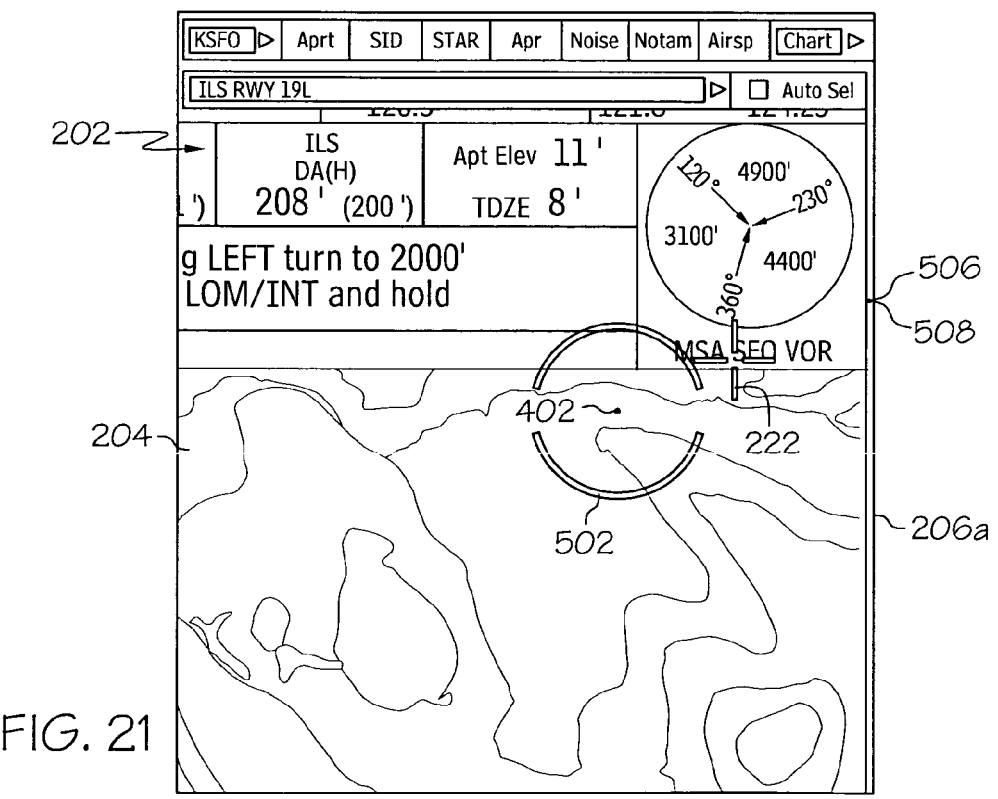
Figure 22:
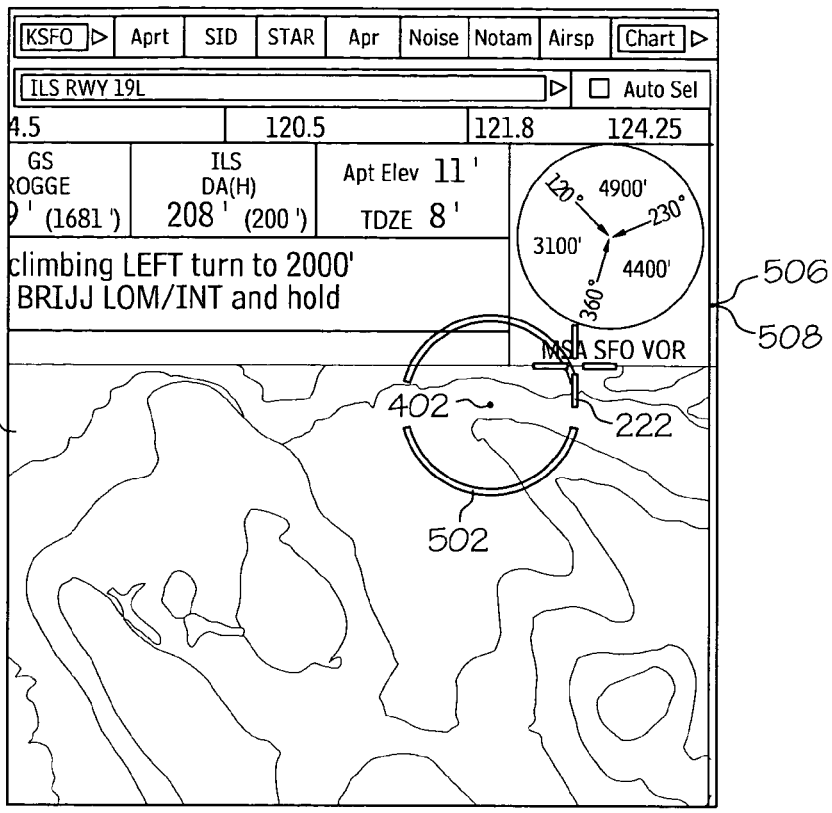
Figure 23:
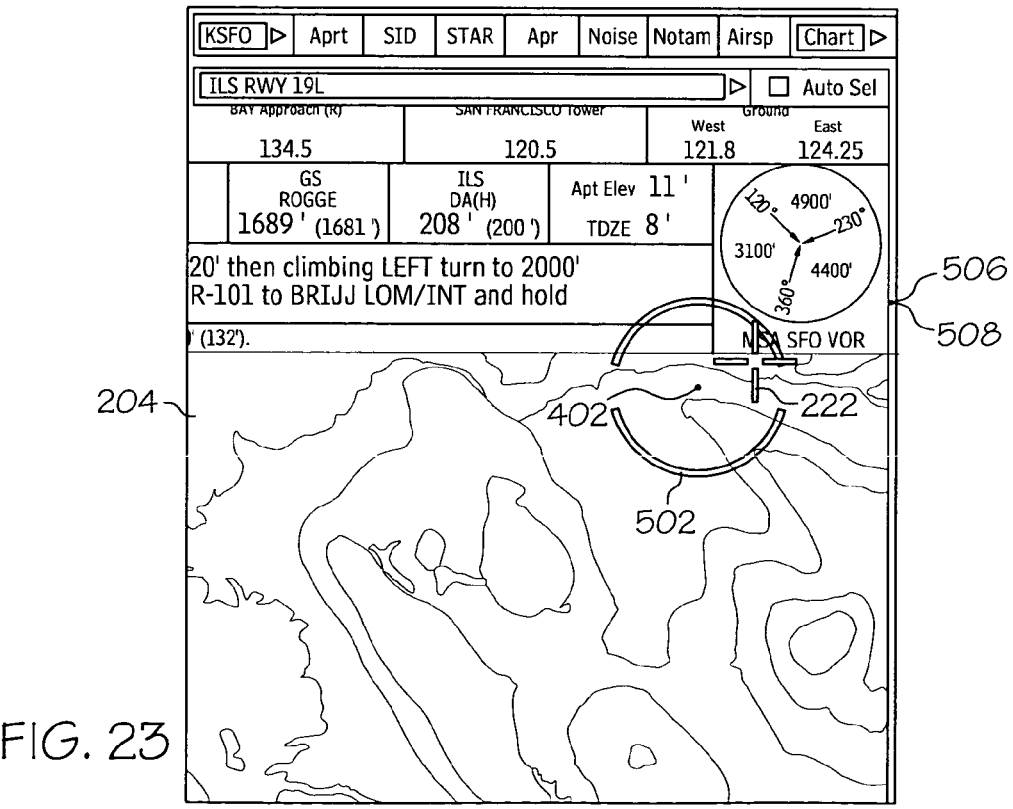
Figure 24:
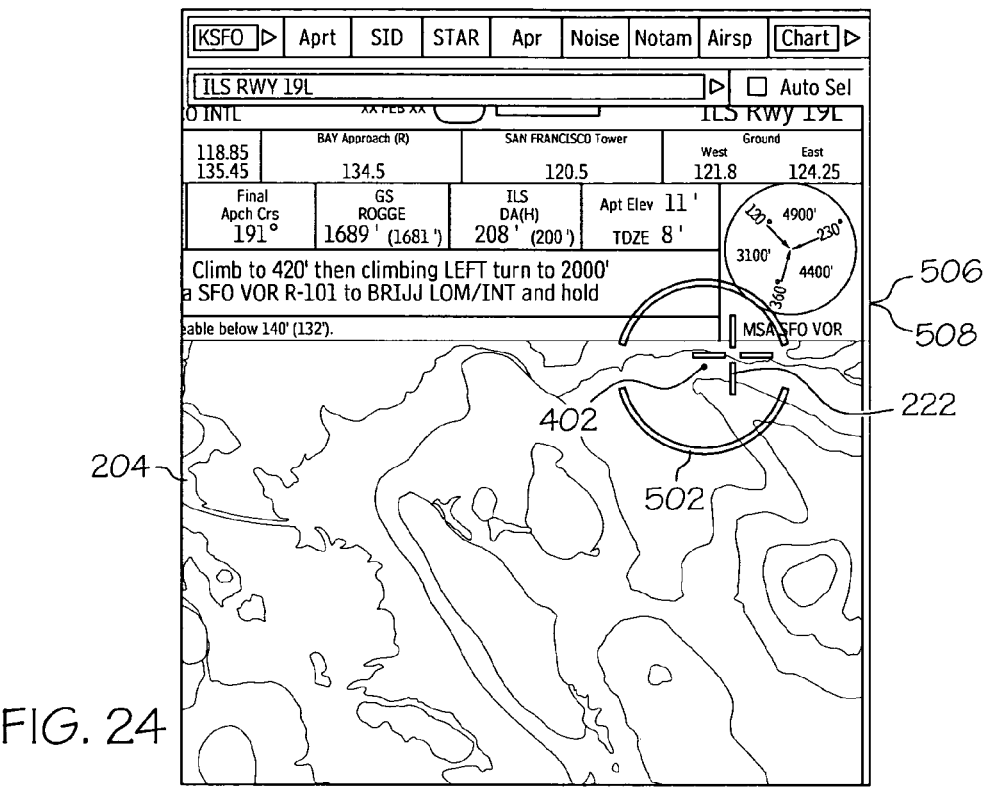
Figure 25:
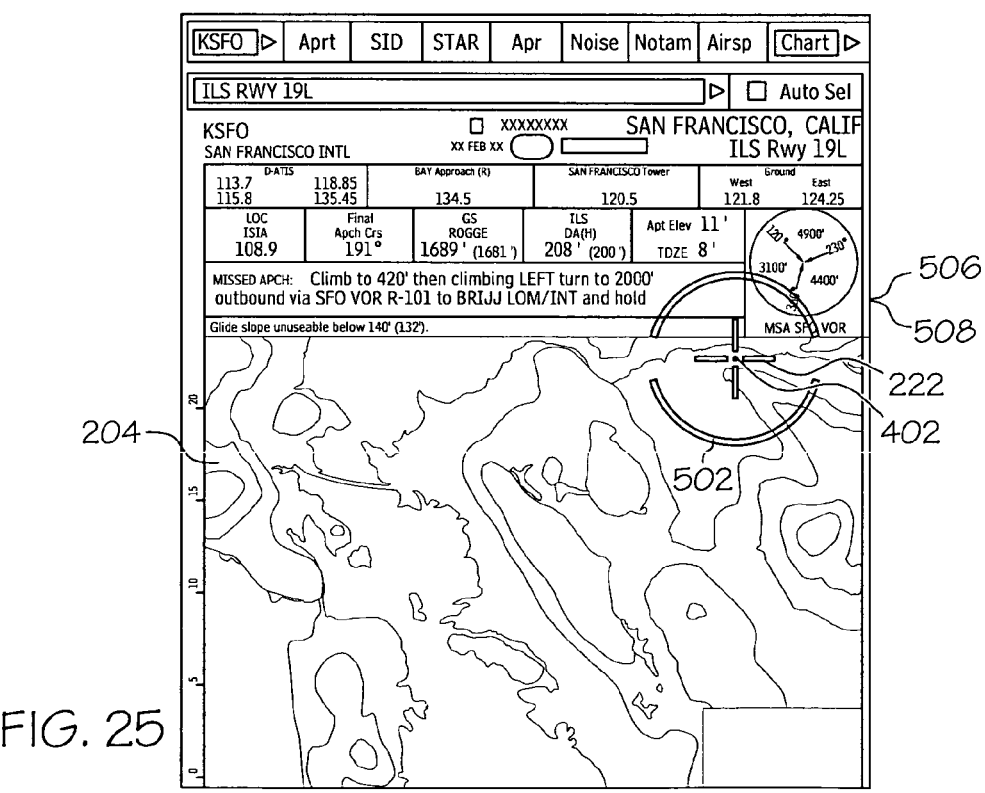

As shown in FIG. 19, for the sixth zoom point 402F, when the image 204 is enlarged it expands to the left, upward, and downward. The magnitude of the expansion upward to the left ($EXP_{left}$), upward ($EXP_{up}$), and downward ($EXP_{down}$) may be expressed as:

$$(EXP_{left})=(MAG_{level})\times(WIDTH_{chart});$$

$$(EXP_{up})=(MAG_{level})\times(HEIGHT_{chart})\times(DISTANCE_{top\ edge\text{-}to\text{-}edge\ point}/HEIGHT_{display\ area});\text{ and}$$

$$(EXP_{down})=(MAG_{level})\times(HEIGHT_{chart})\times(DISTANCE_{bottom\ edge\text{-}to\text{-}edge\ point}/HEIGHT_{display\ area}),$$

where:
 $HEIGHT_{chart}$=original chart height
 $DISTANCE_{top\ edge\text{-}to\text{-}edge\ point}$=distance from top window edge to edge point,
 $DISTANCE_{bottom\ edge\text{-}to\text{-}edge\ point}$=distance from bottom window edge to edge point, and
 $HEIGHT_{display\ area}$=the height of the display area.

Referring back to FIG. 3, it is seen that, at some point in time, either before or after a desired magnification level or the maximum magnification level is reached, the user 109 may move the displayed image 204 by, for example, scrolling it (320). The user 109 may also move the cursor symbol 222 (324). These events, and the specific processes carried out by the system 100 will be described in more detail below. First, however, the process implemented by the system 100 to reduce the displayed image 204 back to its pre-enlarged size, or some intermediate size (e.g., "zoom out on" the image), without movement of either the image 204 (e.g., scrolling) or the cursor symbol 222, will first be described (338).

With reference to FIGS. 20-25, which depict the displayed image 204 at decreasing levels of magnification, it is seen that, upon receipt of an appropriate command from the user 109 (336), such as turning the zoom knob 112 in the appropriate direction, the processor 104 begins zooming out on the selected zoom point 402 (338). Specifically, as shown most clearly in FIG. 20, the processor 104 reduces the relative size of the displayed image 204. Since, as was noted above, the processor 104 determines and stores the position of the zoom point 402 before the image 204 is enlarged (304), when the image 204 is subsequently reduced the zoom point 402 translates toward its original, or "minimum zoom," position along the same imaginary zoom line 504, but in the opposite direction. Similar to what occurs when the image 204 is enlarged (312), the cursor symbol 222 remains at its original position while the image 204 is reduced, unless the user 109 moves it using the CCD 110. Also, the zoom symbol 502 moves with the zoom point 402 as it translates toward its minimum zoom point.

As FIGS. 20-25 also show, the image edge point 508 remains in its initial position as the size of the image 204 decreases, and the entire edge of the image 204 that includes the image edge point 508 remains aligned with the display area edge 206a. This, too, is similar to what occurs when the image 204 is enlarged. Indeed, during image reduction, the image 204 is contracted around the image edge point 508 in a manner similar, but opposite, to how the image 204 is expanded. As such, the same mathematic expressions used to describe how the image 204 expands around the image edge point 508 may be concomitantly used to describe how the image 204 contracts around the edge point 508, but with opposite mathematical signs. As long as the user 109 continues supplying the reduce command (336), the processor 104 will continue reducing the image 204, at least until the zoom point 402 reaches its minimum zoom point. It was previously noted that the processor 104, in addition to determining and storing the position of the zoom point 402, also determines and stores the position of the visible image edges (304). Thus, if the image 204 is not moved subsequent to being enlarged, each point in the image 204 will be returned to its original, pre-enlargement position, when the image 204 is subsequently reduced to the minimum zoom condition.

It was noted above that, at some point in time, either before or after a desired magnification level or the maximum magnification level is reached, the user 109 may either move the displayed image 204 (320) or move the cursor symbol 222 (324). Thereafter, the image 204 may then be reduced in size or, if the maximum magnification level has not been attained, the image 204 may be further zoomed in on, based on a subsequently selected zoom point. If the displayed image 204 is moved (320) such that some or all of the image sections that were originally part of the non-viewable sections 220 are now viewable sections 218, then the visible image edges at the minimum zoom condition and concomitantly, the position of the minimum zoom point, have both changed. The processor 104 updates and stores these new respective pre-enlargement (e.g., "minimum zoom") positions (322). As a result, when the image 204 is subsequently reduced, each point in the image 204 will be returned to its new minimum zoom position, in accordance with the previously described image reduction/contraction process.

Figure 26:
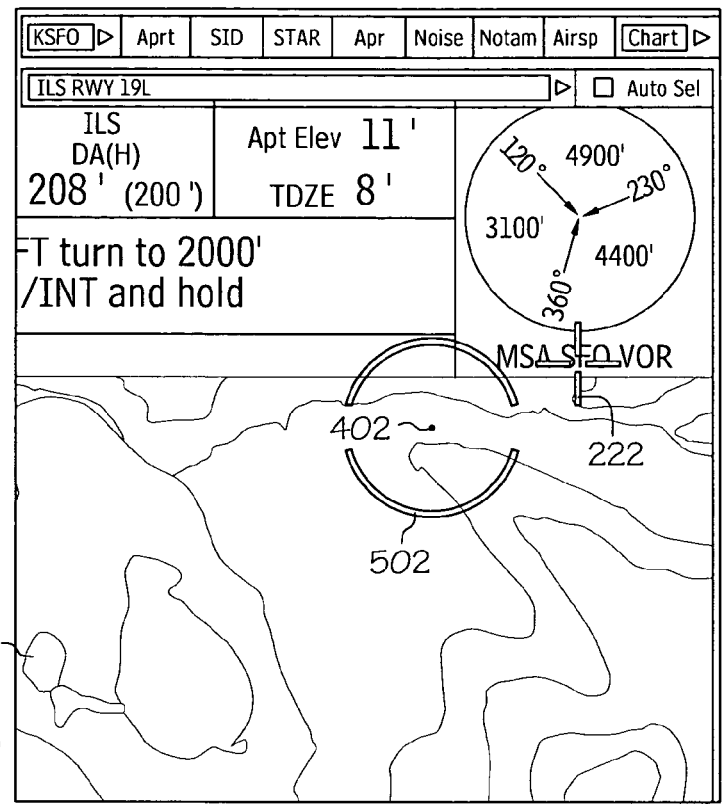
FIGS. 26-30 are similar to FIGS. 20-25, and depict the operation of the system when a new zoom point is selected following image enlargement to a maximum magnification level, and is then subsequently reduced.
Figure 27:
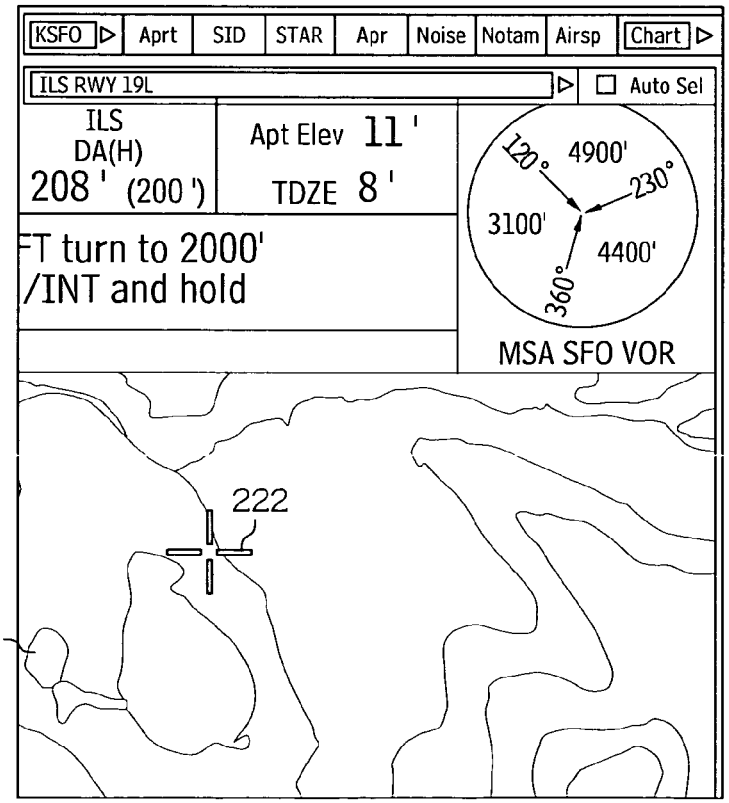
Figure 28:
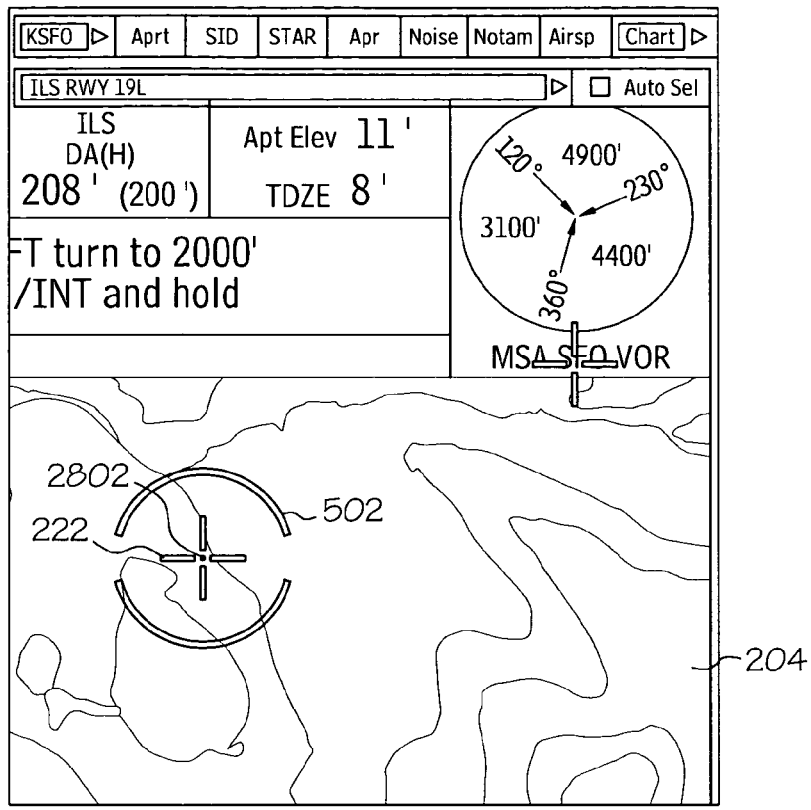

With reference now to FIGS. 26-28, the case in which the cursor symbol 222 is moved after the image 204 is enlarged to the maximum magnification level will first be discussed. It should be appreciated that the image 204 shown in FIG. 26 is the same as that shown in FIG. 10. That is, the image 204 has been enlarged to the maximum magnification level for the selected zoom point 402. Thereafter, in FIG. 27, the cursor symbol 222 is moved to a new location on the image 204 (324), and the zoom symbol 502 is no longer displayed (326). The zoom symbol 502 does not reappear until a new zoom point 2802 is selected (328), as shown in FIG. 28. Once the new zoom point 2802 is selected (328), its position is determined and stored (330). If the displayed image 204 were not at the maximum magnification level already, the image 204 could be further enlarged (312); this latter case will be described further below. However, because the image depicted in FIG. 28 is at the maximum magnification level already, the process implemented by the system 100 to reduce the image 204 based on the new selected zoom point 2802 will now be described.

Figure 29:
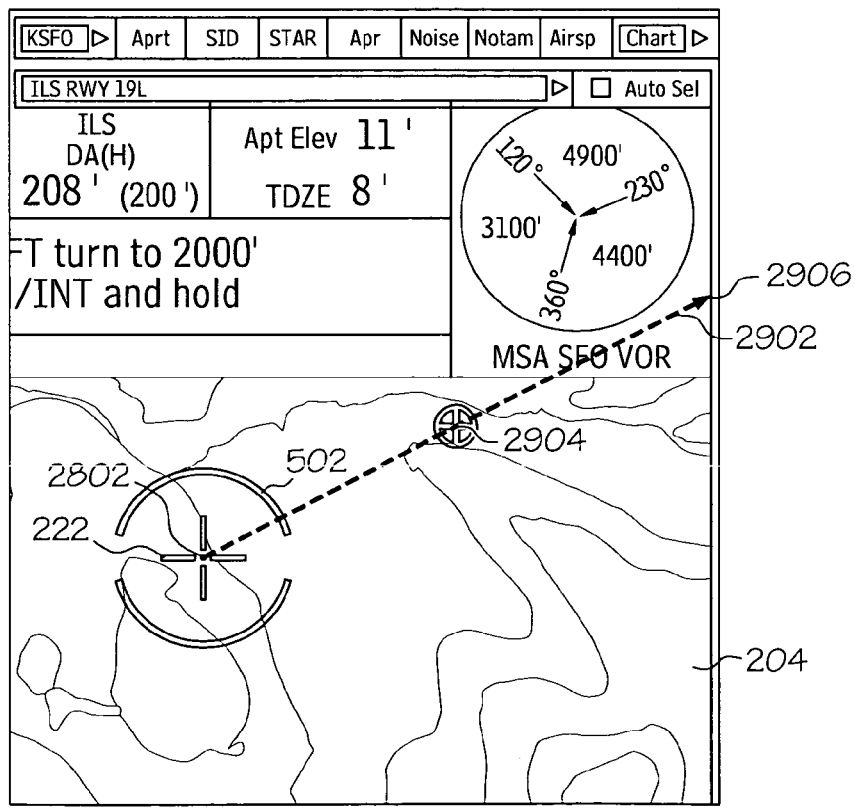
Figure 30:
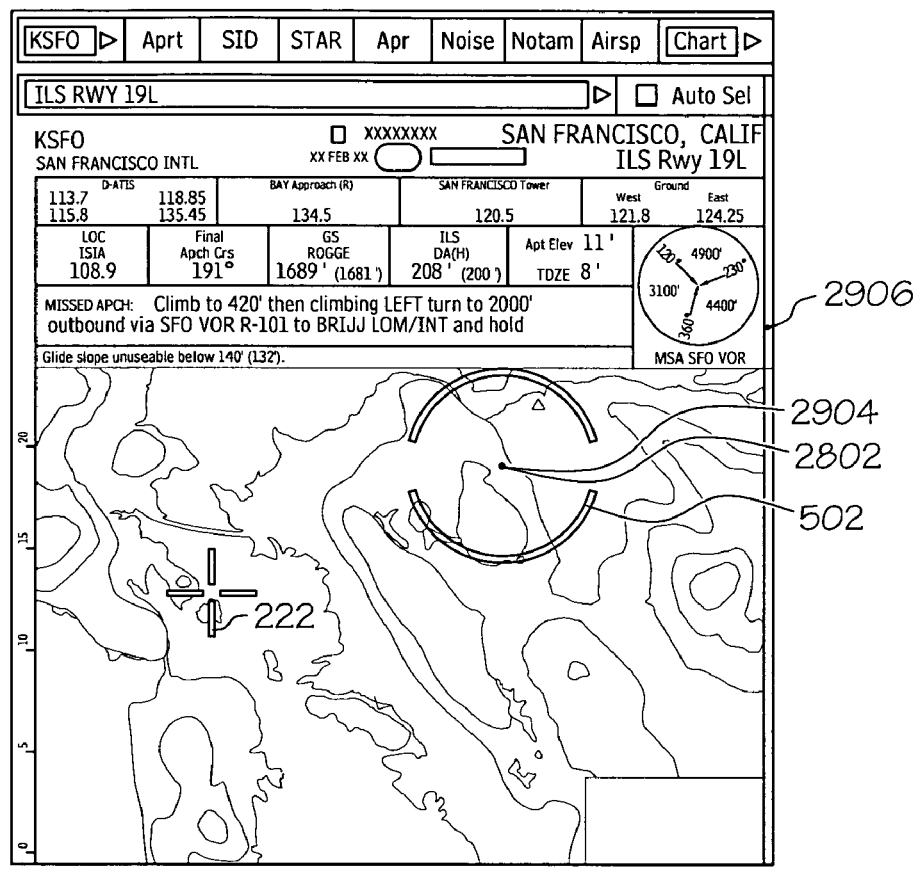

It will be appreciated that the new selected zoom point 2802 does not reside on the zoom line 504 that extends from the display area central point 210 to the image edge point 508. Moreover, the new zoom point 2802 does not reside on the zoom line that would have extended from an image edge point to the display central point 210, had the new zoom point 2802 been the originally-selected zoom point. Thus, as shown in FIG. 29, when the size of the displayed image 204 is subsequently reduced, the image 204 is contracted such that new zoom point 2802 translates along a new zoom line 2902 that extends from the new zoom point 2802, through the new zoom point's original, pre-enlargement position 2904, to a new image edge point 2906 (332). As a result, when the image 204 is subsequently reduced to its original, pre-enlargement size, as shown in FIG. 30, the new zoom point 2802 is returned to its original position 2904.

Figure 31:
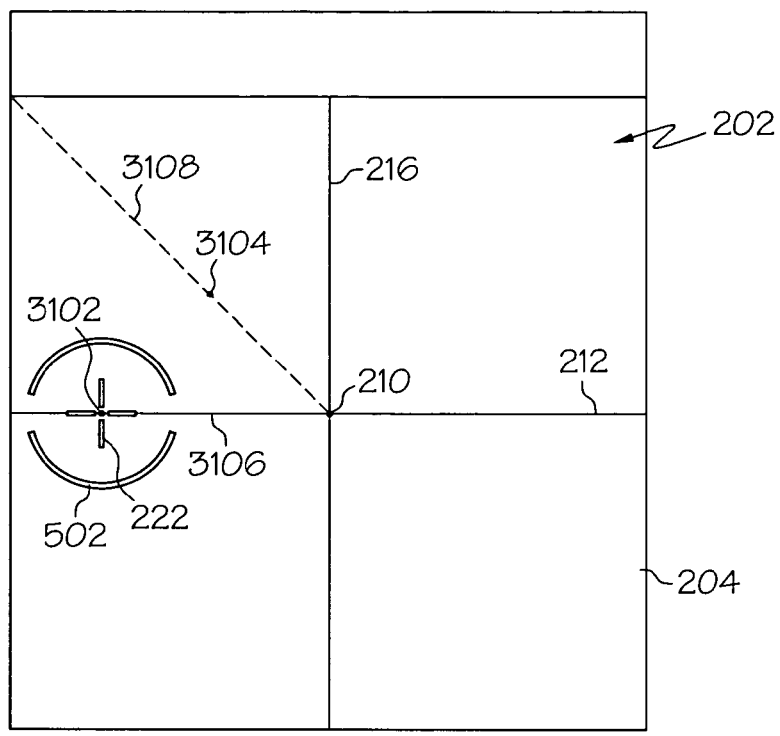
FIGS. 31-34 are simplified representations of the display screens shown in FIGS. 26-30, but depict the operation of the system according to an exemplary embodiment, when the image is enlarged to a magnification level below the maximum level, and a new zoom point is selected and subsequently enlarged.
Figure 32:
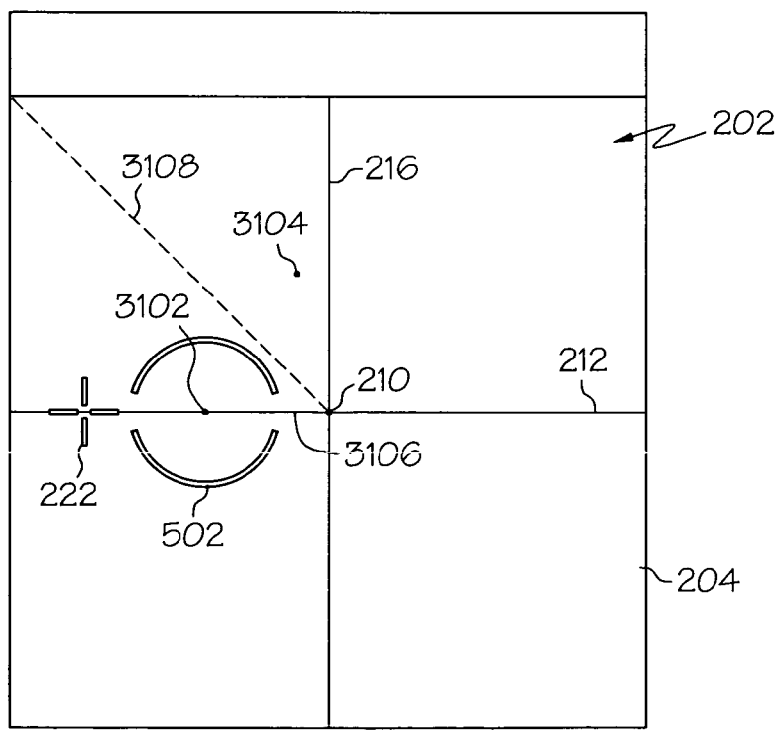
Figure 33:
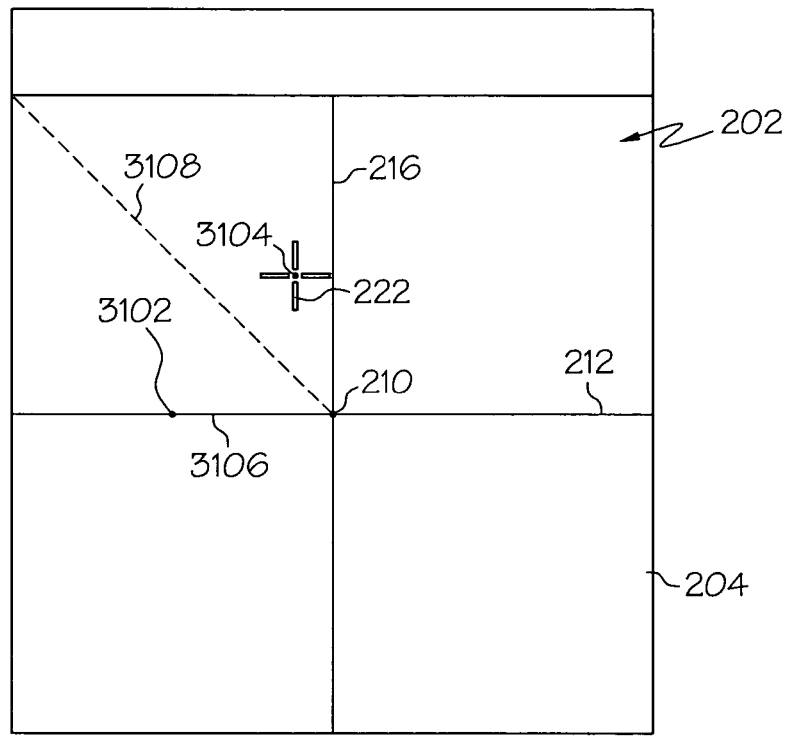

Turning now to FIG. 31-33, the case in which the displayed image 204 is partially enlarged, and the cursor symbol 222 is moved, and then a new zoom point is selected, and the image 204 is further enlarged, will now be described. For simplicity and ease of explanation, a simplified representation of the display area 202, similar to that depicted in FIGS. 13-19, will be used. With reference first to FIG. 31, for ease of understanding and explanation, two zoom points and two zoom lines are labeled on the image 204. The first zoom point 3102 is the originally selected zoom point, and the second zoom point 3104 is a subsequently selected zoom point at its original (e.g., minimum zoom) position. The first zoom line 3106 is the zoom line associated with the first zoom point 3102, and the second zoom line 3108 is the zoom line associated with the second zoom point 3104, had the second zoom point 3108 been originally selected as the desired zoom point.

Figure 34:
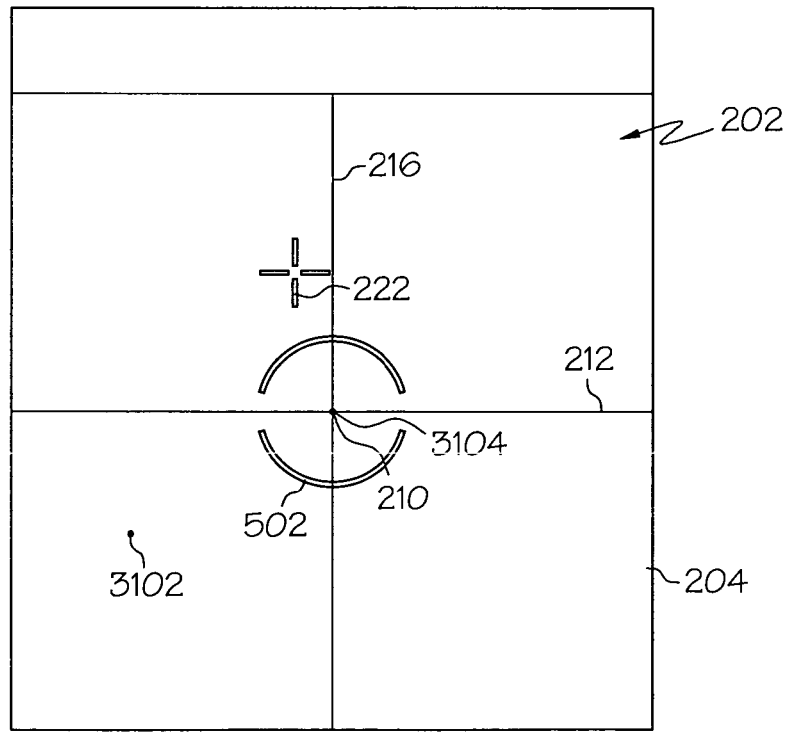

As is shown in FIGS. 32-34, after the image 204 is partially enlarged (FIG. 32), the user 109 moves the cursor symbol 222 (324), and the zoom symbol 502 is no longer displayed (326) (FIG. 33). The second zoom point 3104 is then selected (328) and its position is determined and stored (330). It is noted that, at this point, the second zoom point 3104 has moved, such that it no longer resides on the second zoom line 3108. Thus, in response to a subsequent enlargement command from the user interface 102 (334), the processor 104, in one embodiment, moves the second zoom point 3104 directly to the position it would have been at, had the second zoom point 3104 been the originally-selected zoom point, and the image 204 had subsequently been enlarged to that magnification level (337) (FIG. 34). Thus, in the depicted embodiment, the second zoom point 3104 would have been positioned at the display area central point 210 for the depicted magnification level, had it, rather than the first zoom point 3102, been the originally-selected zoom point.

Figure 35:
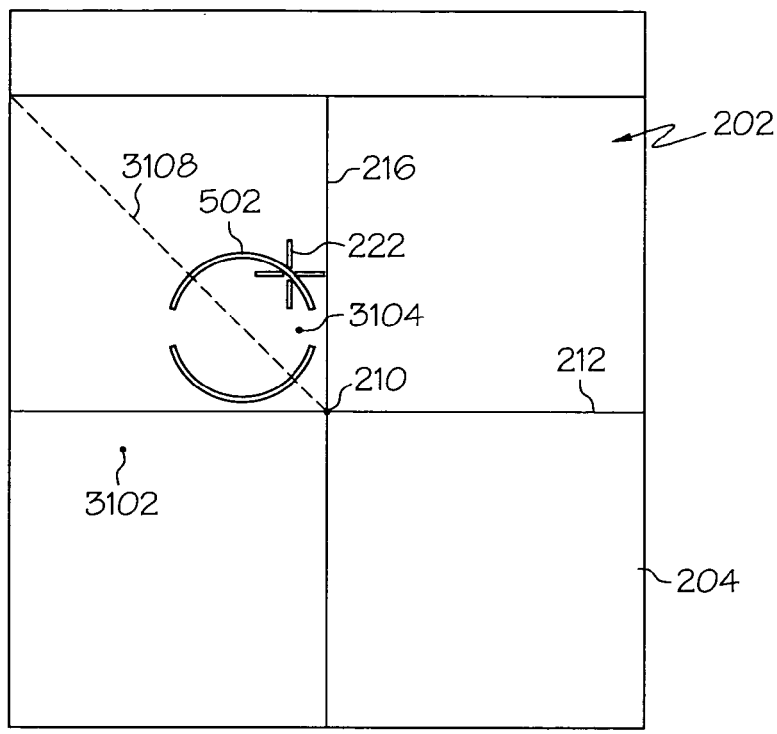
FIGS. 35 and 36 are similar to FIGS. 31-34, but show the operation of the system in accordance with alternative embodiment, when the image is enlarged to a magnification level below the maximum level, and a new zoom point is selected and subsequently enlarged.
Figure 36:
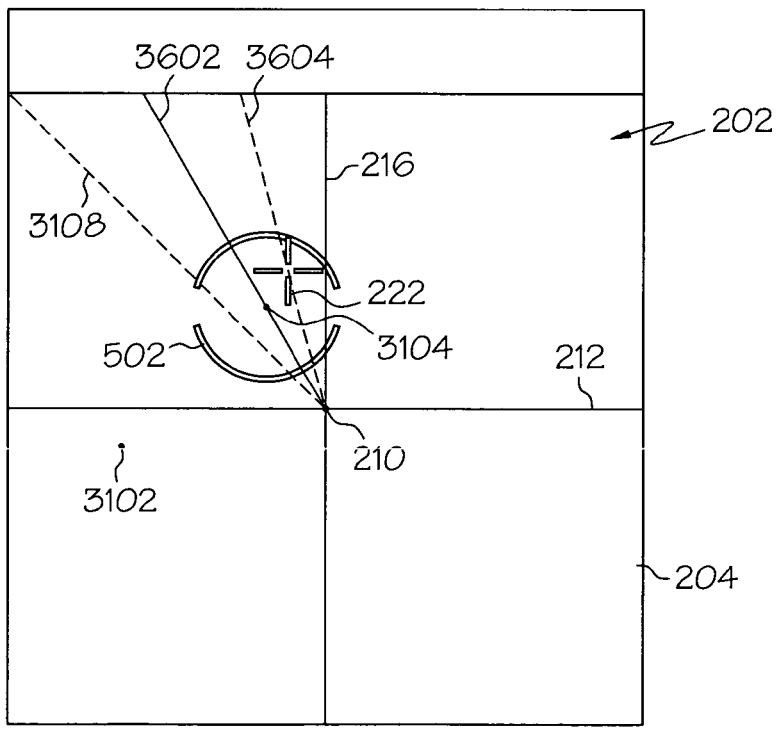

It will be appreciated that the above-described image enlargement process implemented by the processor 104 following cursor symbol 222 movement, is merely exemplary of one of numerous processes that could be used. For example, as shown in FIG. 35, following selection of the second zoom point 3104, and before image enlargement begins, the image 204 could first be moved such that the second zoom point 3104 resides on the second zoom line 3108. In another exemplary alternative embodiment, which is shown most clearly in FIG. 36, an averaging technique is used. More specifically, the processor 104 draws a new imaginary zoom line 3602, which is an average of the second zoom line 3108 and a zoom line 3604 that extends from the display area central point 210, through the second zoom point's present position, to the image area edge 206. The zoom point 3104 is moved along this new imaginary zoom line 3602 as the image 204 is enlarged. With this latter embodiment, any jittery or jerky motions that may be associated with the other two alternative embodiments, is minimized.

The display system and the method it implements to change the relative size of images displayed in the display system, uses the entire display space during zooming, and minimizes user inputs. Moreover, the system and the implemented method retain proper user orientation to the image while the size of the displayed image is being changed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. In a display including one or more edges that define a display area in which at least a portion of an image including an image edge point is displayed, a method of changing the relative size of the image, comprising the steps of:
   selecting a zoom point in the displayed image, the zoom point corresponding to a point in the displayed image, the image edge point located at a position on the display area edge that coincides with an edge point on the display area; and
   changing the relative size of the displayed image while (i) translating the selected zoom point along a straight zoom line that passes through the selected zoom point and extends between a central point in the display area and the display area edge point and (ii) maintaining the position of the image edge point such that the image edge point remains coincident with the display area edge point,
   wherein, when the selected zoom point coincides with the central point in the display area, the selected zoom point does not translate while the relative size of the displayed image is changing.

2. The method of claim 1, further comprising:
   inhibiting any further change in relative size, and any further translation along the zoom line, when the relative size change attains a predetermined magnitude or, when the selected zoom point does not coincide with the central point in the display area, the selected zoom point reaches the central point in the display area.

3. The method of claim 1, further comprising:
   while changing the relative size of the displayed image, translating at least a portion of the displayed image out of the display area.

4. The method of claim 1, further comprising:
   displaying a zoom symbol in the display area that at least partially surrounds the selected zoom point; and
   translating the zoom symbol coincident with the translation of the selected zoom point.

5. The method of claim 4, further comprising:
   displaying a cursor symbol in the display area; and
   removing the zoom symbol from the display area when the cursor symbol is moved.

6. The method of claim 1, wherein the selected zoom point is translated along the zoom line from an original position to a final position, and wherein the method further comprises:
storing data representative of at least the selected zoom point original position.

7. The method of claim 6, further comprising:
translating the selected zoom point along a straight line from the final position to the stored original position when changing the relative size of the displayed image in a manner opposite to that which it was originally changed.

8. The method of claim 7, wherein the displayed image comprises a plurality of image points, and wherein the method further comprises:
translating each image point from an original position to a final position when changing the relative size of the displayed image.

9. The method of claim 8, further comprising:
storing data representative of each image point original position.

10. The method of claim 9, further comprising:
translating each image point along a straight line from its final position to its stored original position when changing the relative size of the displayed image in a manner opposite to that which it was originally changed.

11. The method of claim 1, wherein the displayed image includes one or more sections that are not visible within the display area, and wherein the method further comprises:
scrolling the displayed image in one or more directions, whereby the original and final positions of the zoom point and each of the image points are each changed to updated original and final positions;
storing each of the updated positions; and
translating the selected zoom point and each image point along a straight line from its final position to its stored updated original position when changing the relative size of the displayed image in a manner opposite to that which it was originally changed.

12. The method of claim 1, further comprising:
selecting a new zoom point after changing the relative size of the displayed image, the new zoom point having an original position and an original zoom line associated therewith,
wherein the new zoom point original position is its position before the relative size of the displayed image was changed, and
wherein the original zoom line is a straight line that passes through the new zoom point original position and extends between the central point in the display area and a display area edge point that is closest to the new zoom point.

13. The method of claim 12, further comprising:
changing the relative size of the displayed image while moving the new zoom point to a position it would have occupied had the new zoom point been the previously selected zoom point, and the relative size of the displayed image had been changed and the new zoom point had been translated along the new zoom point original zoom line.

14. The method of claim 12, further comprising:
moving the new zoom point from its present position to a new position on the new zoom point original zoom line; and
changing the relative size of the displayed image while translating the new zoom point along the new zoom point original zoom line.

15. The method of claim 12, further comprising:
moving the new zoom point from its present position to a new position on an average zoom line; and
changing the relative size of the displayed image while translating the new zoom point along the average zoom line,
wherein the average zoom line corresponds to an average of the new zoom point original zoom line and a new zoom point zoom line, the new zoom point zoom line passing through the new zoom point at its position prior to the displayed image being enlarged, and extending between the central point in the display area and the display area edge point that is closest to the new zoom point.

16. A display device, comprising:
a user interface operable to receive user input and supply one or more command signals;
a display screen having a display area edge that defines an image display area in which a displayed image may be rendered, the displayed image including an image edge point located at a point on the display area edge; and
a processor coupled receive the commands from the user interface and operable, in response thereto, to (i) select a zoom point in the displayed image that corresponds to a point in the displayed image (ii) change the relative size of the displayed image while translating the selected zoom point along a straight zoom line that passes through the selected zoom point and extends between a central point in the display area and the display area edge point and (iii) maintain the position of the image edge point while the relative size of the displayed image is changing such that the image edge point remains coincident with the display area edge point,
wherein, when the selected zoom point coincides with the central point in the display area, the selected zoom point does not translate while the relative size of the displayed image is changing.

17. The system of claim 16, wherein the processor is further operable to:
inhibit any further change in relative size, and any further translation along the zoom line, when the relative size change attains a predetermined magnitude or the selected zoom point reaches the central point in the display area.

18. The system of claim 16, wherein the processor is further operable to translate at least a portion of the displayed image out of the display area while the relative size of the displayed image is changing.

19. The system of claim 16, wherein the processor is further operable to:
display a zoom symbol in the display area that at least partially surrounds the selected zoom point; and
translate the zoom symbol coincident with the translation of the selected zoom point.

20. The system of claim 19, wherein the processor is further operable to:
display a cursor symbol in the display area; and
remove the zoom symbol from the display area when the cursor symbol is moved.

21. The system of claim 16, wherein the processor is further operable to:
translate the selected zoom point along the zoom line from an original position to a final position, and
store data representative of at least the selected zoom point original position.

22. The system of claim 21, wherein the processor is further operable to:

translate the selected zoom point along a straight line from the final position to the stored original position when changing the relative size of the displayed image in a manner opposite to that which it was originally changed.

23. The system of claim 22, wherein the displayed image comprises a plurality of image points, and wherein the processor is further operable to:

translate each image point from an original position to a final position when the relative size of the displayed image is changing.

24. The system of claim 23, wherein the processor is further operable to store data representative of each image point original position.

25. The system of claim 24, wherein the processor is further operable to translate each image point along a straight line from its final position to its stored original position when changing the relative size of the displayed image in a manner opposite to that which it was originally changed.

26. The system of claim 16, wherein:

the displayed image includes one or more sections that are not visible within the display area; and the processor is further operable to:

scroll the displayed image in one or more directions, in response to one or more command signals from the user interface, whereby the original and final positions of the zoom point and each of the image points are each changed to updated original and final positions, store each of the updated positions, and translate the selected zoom point and each image point along a straight line from its final position to its stored updated original position when changing the relative size of the displayed image in a manner opposite to that which it was originally changed.

27. The system of claim 16, wherein:

the processor, in response to the command signals, is further operable to select a new zoom point after the relative size of the displayed image changed, the new zoom point having an original position and an original zoom line associated therewith;

the new zoom point original position is its position before the relative size of the displayed image was changed; and the original zoom line is a straight line that passes through the new zoom point original position and extends between the central point in the display area and a display area edge point that is closest to the new zoom point.

28. The system of claim 27, wherein the processor is further operable to change the relative size of the displayed image while moving the new zoom point to a position it would have occupied had the new zoom point been the previously selected zoom point, and the relative size of the displayed image had been changed and the new zoom point had been translated along the new zoom point original zoom line.

29. The system of claim 27, wherein the processor is further operable to:

move the new zoom point from its present position to a new position on the new zoom point original zoom line; and change the relative size of the displayed image while translating the new zoom point along the new zoom point original zoom line.

30. The system of claim 27, wherein:

the processor is further operable to (i) move the new zoom point from its present position to a new position on an average zoom line and (ii) change the relative size of the displayed image while translating the new zoom point along the average zoom line; and the average zoom line corresponds to an average of the new zoom point original zoom line and a new zoom point zoom line, the new zoom point zoom line passing through the new zoom point at its position prior to the displayed image being enlarged, and extending between the display area central point and the display area edge point that is closest to the new zoom point.

* * * * *